(12) United States Patent
Saito

(10) Patent No.: US 8,688,864 B2
(45) Date of Patent: Apr. 1, 2014

(54) INFORMATION PROCESSING APPARATUS, INFORMATION PROCESSING METHOD, AND INFORMATION PROCESSING PROGRAM

(75) Inventor: Megumi Saito, Chuo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1120 days.

(21) Appl. No.: 11/564,775

(22) Filed: Nov. 29, 2006

(65) Prior Publication Data

US 2007/0146759 A1 Jun. 28, 2007

(30) Foreign Application Priority Data

Dec. 22, 2005 (JP) ................................. 2005-370164
Oct. 4, 2006 (JP) ................................. 2006-272765

(51) Int. Cl.
*G06F 3/00* (2006.01)

(52) U.S. Cl.
USPC ............................................................. 710/8

(58) Field of Classification Search
USPC ............................................................. 710/8
See application file for complete search history.

(56) References Cited

U.S. PATENT DOCUMENTS 7,040,530 B2 * 5/2006 Watanabe et al. ............. 235/375
7,286,682 B1 10/2007 Sharma et al.
2003/0066027 A1 4/2003 Nakagiri
2003/0117639 A1 * 6/2003 Milton et al. ................. 358/1.13
2004/0061897 A1 * 4/2004 Onishi ......................... 358/1.15
2004/0223182 A1 * 11/2004 Minagawa .................... 358/1.15
2005/0094200 A1 * 5/2005 Uekusa et al. ............... 358/1.15
2005/0097229 A1 5/2005 Saito et al.
2005/0206953 A1 * 9/2005 Kujirai et al. ................ 358/1.15
2005/0273657 A1 * 12/2005 Ichiki et al. ..................... 714/25
2007/0127069 A1 * 6/2007 Steele et al. ................. 358/1.16

FOREIGN PATENT DOCUMENTS

| CN | 1405668 B | 3/2003 |
|----|-----------|--------|
| EP | 1293885 A2 | 3/2003 |
| EP | 1293885 A3 | 8/2007 |
| JP | 11-327830 A | 11/1999 |
| JP | 2000-187570 A | 7/2000 |
| JP | 2003-091384 A | 3/2003 |
| JP | 2003-308215 A | 10/2003 |
| JP | 2004-070572 A | 3/2004 |
| JP | 2004-220300 A | 8/2004 |

* cited by examiner

*Primary Examiner* — Kris Rhu
(74) *Attorney, Agent, or Firm* — Canon USA Inc. IP Division

(57) ABSTRACT

In a wizard process used by a printer driver, a screen to be displayed is dynamically produced in accordance with device function information provided by the printer driver and a setting value input by a user. In this technique, it is not necessary to separately prepare wizard programs for respective printer drivers, which makes it possible to develop the wizard program in a highly efficient and easy manner.

8 Claims, 20 Drawing Sheets

FIG. 6

RESOURCE PRIORITY TABLE — 3023

PAPER SIZE RESOURCE PRIORITY TABLE — 601

|  | RESOURCE A | RESOURCE B | RESOURCE C |
|---|---|---|---|
| A3 PRINTER | 1 | × | × |
| LARGE SIZE | 2 | 1 | × |
| FREE SIZE PRINTER | 2 | × | 1 |

BINDING METHOD RESOURCE PRIORITY TABLE — 602

|  | RESOURCE A | RESOURCE B | RESOURCE C |
|---|---|---|---|
| RIGHT, LEFT | 1 | × | × |
| RIGHT, LEFT, SADDLE | 2 | 1 | × |
| POCKET BINDING | 2 | × | 1 |

FINISHING RESOURCE PRIORITY TABLE — 603

|  | RESOURCE A | RESOURCE B | RESOURCE C | RESOURCE D |
|---|---|---|---|---|
| BINDING + TRIMMING | 2 | × | × | 1 |
| (ABOVE) + CASING | 3 | 2 | × | 1 |
| (ABOVE) + STAPLING | 4 | 3 | 1 | 2 |

FIG. 7

| | FIG. 7A |
|---|---|
| | FIG. 7B |

FIG. 7A

SCENARIO — 7001

BINDING SCENARIO
1: PAPER SIZE SETTING
2: BINDING SETTING
3: FINISHING SETTING
  3-1: DETAILS OF BINDING MARGIN
  3-2: DETAILS OF TRIMMING
  3-3: DETAILS OF CASING
  3-4: DETAILS OF STAPLING

DEVICE FUNCTIONS NOTIFIED FROM DRIVER — 7103

PAPER SIZES: A4, A3, B4 (A3 PRINTER)
BINDING: RIGHT, LEFT, SADDLE
FINISHING: BINDING MARGIN, TRIMMING, CASING
(STAPLING IS NOT SUPPORTED)

START BINDING WIZARD ⇒ A4, A3, AND B4 SUPPORTED

| PAPER SIZE SETTING UI RESOURCE | RESOURCE A SETTING FOR A4, A3, AND B4 | RESOURCE B SETTING FOR A4, A3, B4, A2, AND A1 — 7004 | RESOURCE C SETTING FOR UP TO A3 AND USER DEFINED PAPER — 7005 |
|---|---|---|---|
| | 7003 | × (FUNCTION) | × (FUNCTION) |
| | PRIORITY=1 (EMPLOYED) | | |

⇒ RIGHT BINDING, LEFT BINDING, AND SADDLE STITCHING SUPPORTED
USER SPECIFIES A4

PAPER SIZE PRIORITY TABLE — 7013

| | RESOURCE A | RESOURCE B | RESOURCE C |
|---|---|---|---|
| A3 PRINTER | 1 | × | × |
| LARGE SIZE | 2 | 1 | × |
| ARBITRARY SIZE | 2 | × | 1 |

TO FIG. 7B

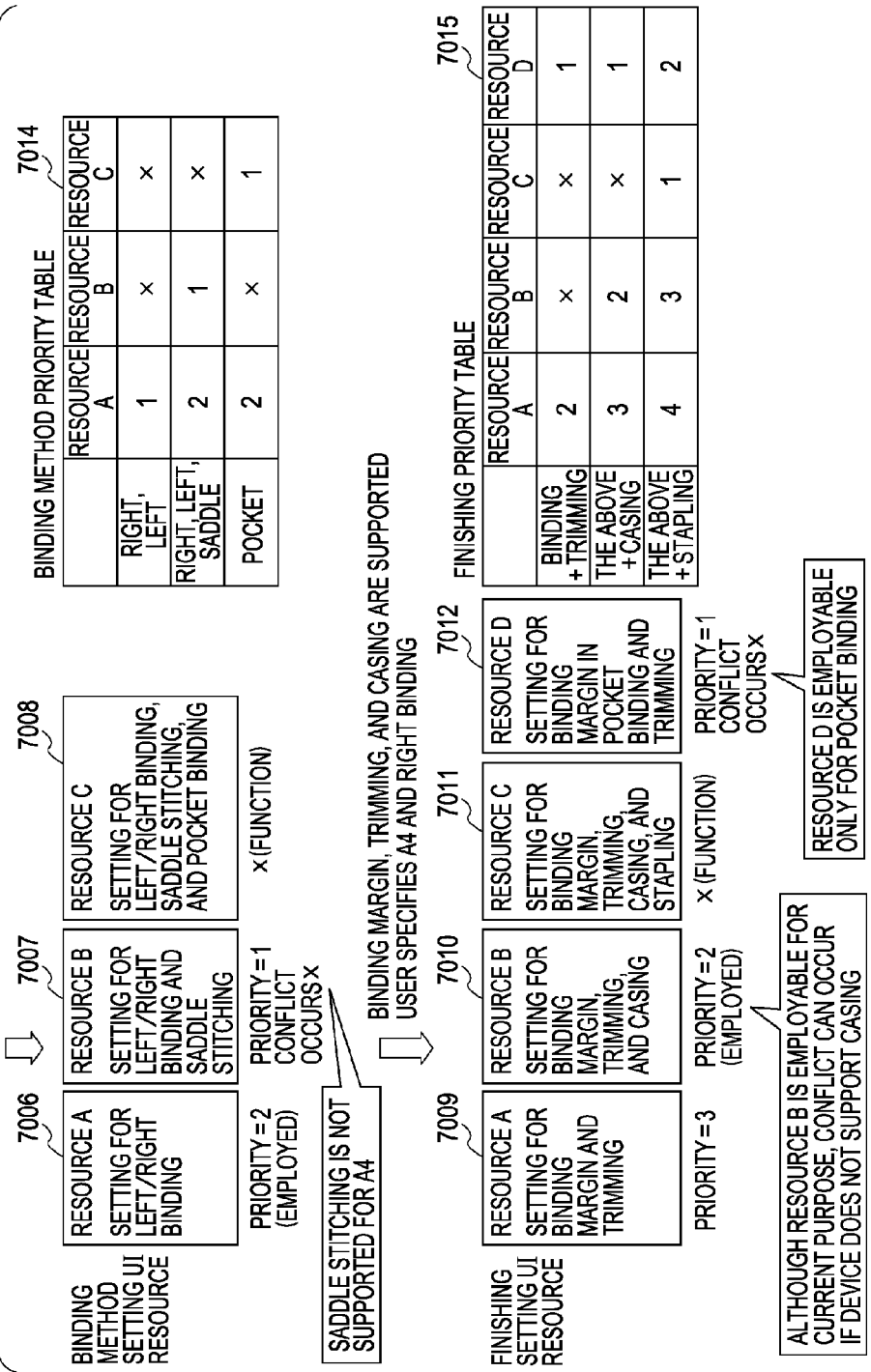

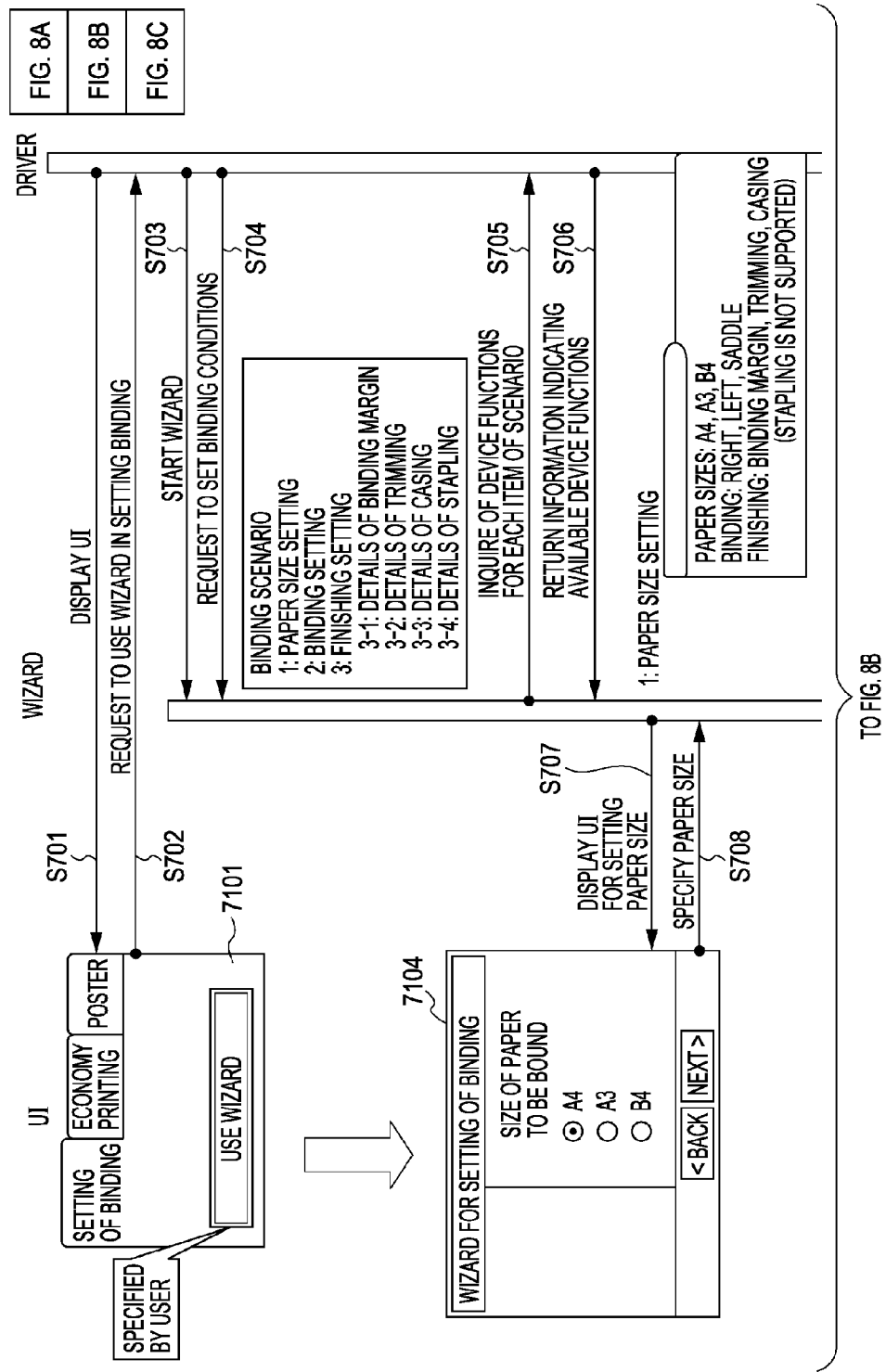

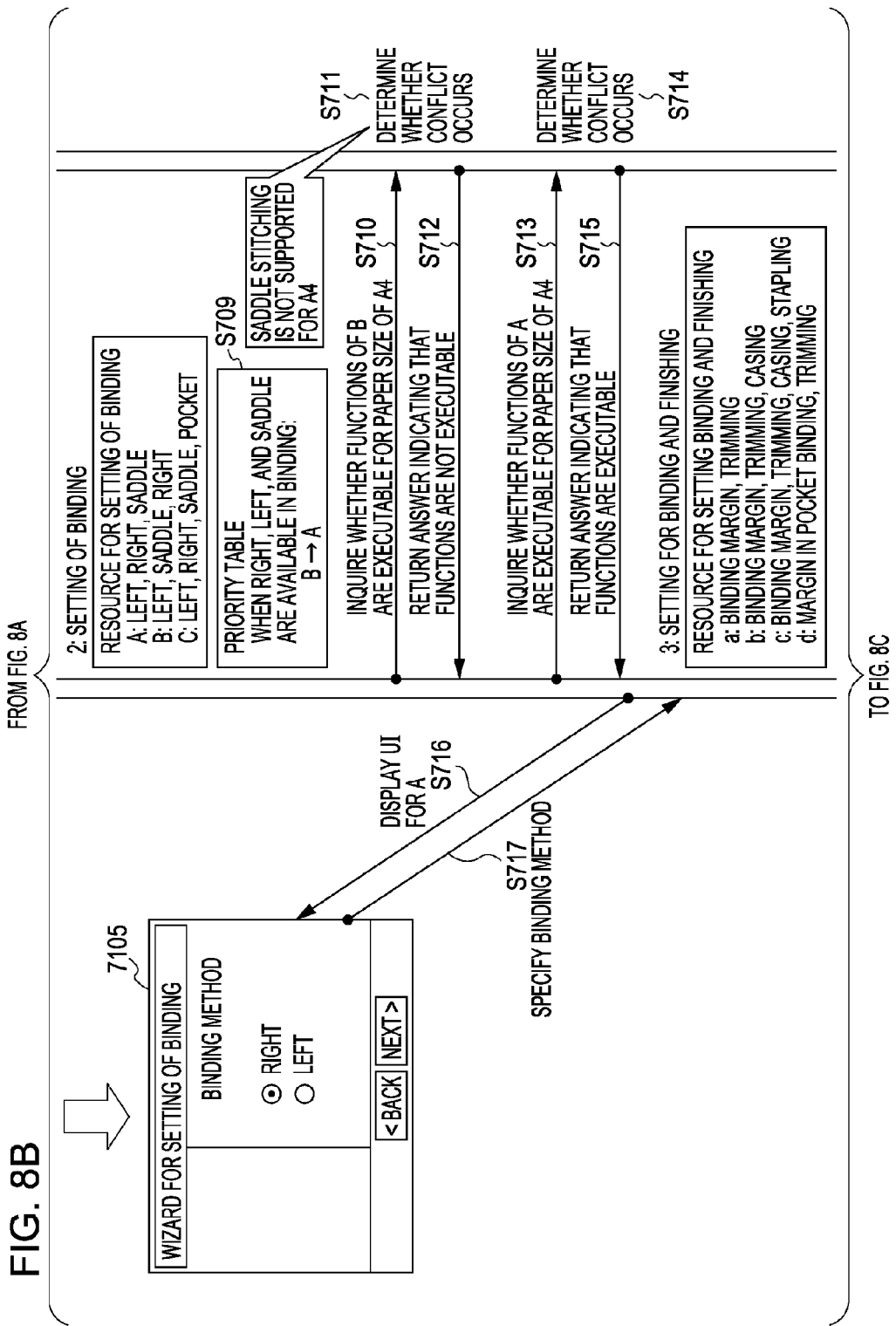

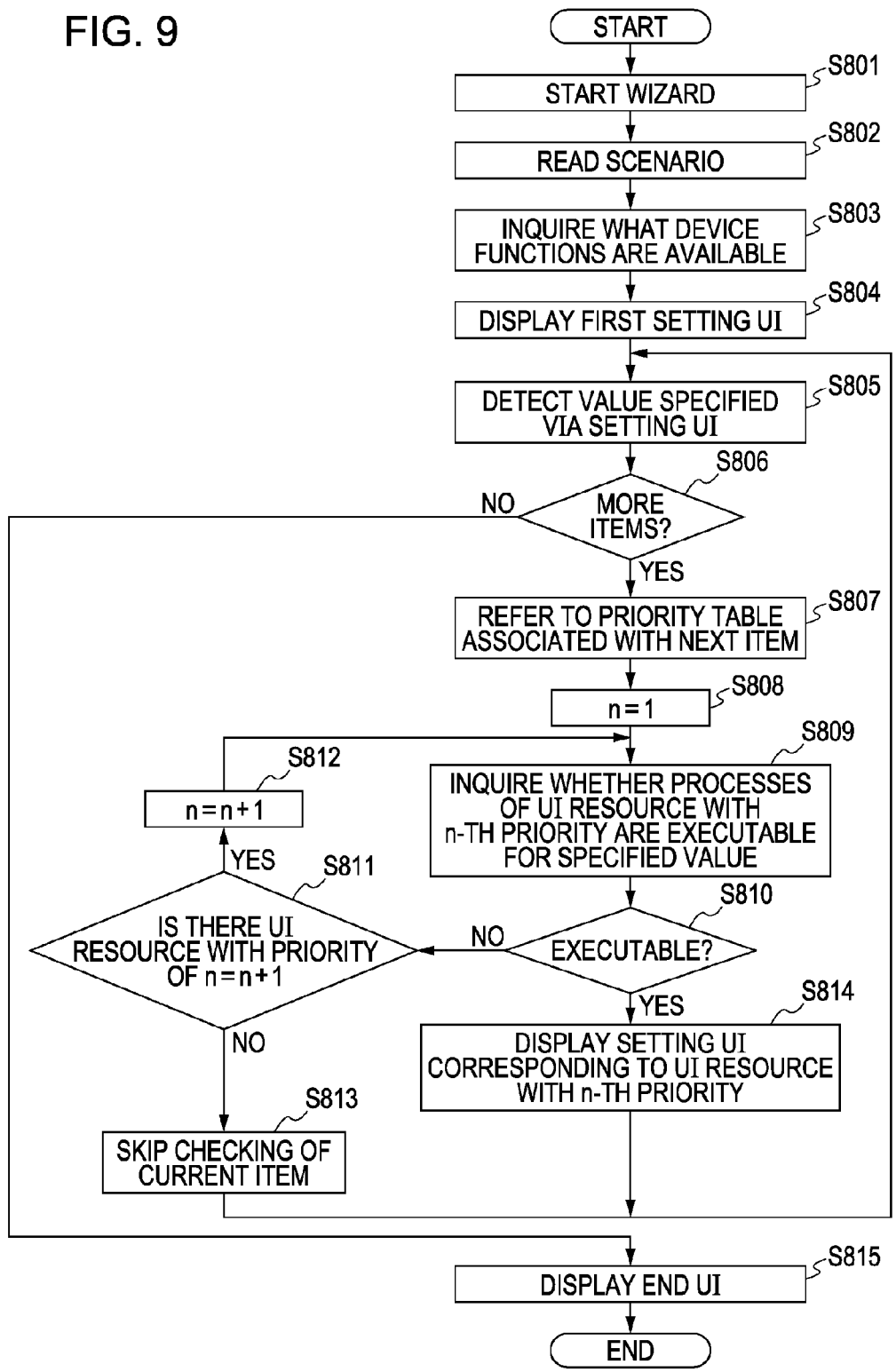

FIG. 14

| | FIG. 14A |
|---|---|
| | FIG. 14B |

FIG. 14A

DEVICE FUNCTIONS NOTIFIED FROM DRIVER

PAPER SIZES: A0, A1, A2, A3, A4, B4 (A0 PRINTER)
BINDING: RIGHT, LEFT, SADDLE
FINISHING: BINDING MARGIN, TRIMMING, CASING
(STAPLING IS NOT SUPPORTED)

SCENARIO
BINDING SCENARIO
1: PAPER SIZE SETTING
2: BINDING SETTING
3: FINISHING SETTING
  3-1: DETAILS OF BINDING MARGIN
  3-2: DETAILS OF TRIMMING
  3-3: DETAILS OF CASING
  3-4: DETAILS OF STAPLING (START BINDING WIZARD) ⇨ A4, A3, B4, A2, A1, AND B0 SUPPORTED

⇨ RIGHT BINDING, LEFT BINDING, AND SADDLE STITCHING SUPPORTED
USER SPECIFIES A4

| PAPER SIZE SETTING UI RESOURCE | RESOURCE A | RESOURCE B | RESOURCE C | RESOURCE D |
|---|---|---|---|---|
| | SETTING FOR A4, A3, AND B4 | SETTING FOR A4, A3, B4, A2, AND A1 | SETTING FOR UP TO A3 AND USER DEFINED PAPER | SETTING FOR A4, A3, B4, A2, A1, AND A0 |
| | PRIORITY = 3 | PRIORITY = 2 | × (FUNCTION) | PRIORITY = 1 (EMPLOYED) |

1311

| | RESOURCE A | RESOURCE B | RESOURCE C | RESOURCE D |
|---|---|---|---|---|
| A3 PRINTER | 1 | × | × | × |
| LARGE SIZE | 2 | 1 | × | × |
| ARBITRARY SIZE | 2 | × | 1 | × |
| A0 PRINTER | 3 | 2 | × | 1 |

FIG. 14B    FROM FIG. 14A

| | RESOURCE A | RESOURCE B | RESOURCE C |
|---|---|---|---|
| RIGHT, LEFT | 1 | × | × |
| RIGHT, LEFT, SADDLE | 2 | 1 | × |
| POCKET | 2 | × | 1 |

FINISHING PRIORITY TABLE

| | RESOURCE A | RESOURCE B | RESOURCE C | RESOURCE D |
|---|---|---|---|---|
| BINDING + TRIMMING | 2 | × | × | 1 |
| THE ABOVE + CASING | 3 | 2 | × | 1 |
| THE ABOVE + STAPLING | 4 | 3 | 1 | 2 |

BINDING METHOD SETTING UI RESOURCE

| RESOURCE A | RESOURCE B | RESOURCE C |
|---|---|---|
| SETTING FOR LEFT/RIGHT BINDING | SETTING FOR LEFT/RIGHT BINDING AND SADDLE STITCHING | SETTING FOR LEFT/RIGHT BINDING, SADDLE STITCHING, AND POCKET BINDING |
| PRIORITY=2 (EMPLOYED) | PRIORITY=1 CONFLICT OCCURS× | ×(FUNCTION) |

SADDLE STITCHING IS NOT SUPPORTED FOR A4

BINDING MARGIN, TRIMMING, AND CASING ARE SUPPORTED
USER SPECIFIES A4 AND RIGHT BINDING

FINISHING SETTING UI RESOURCE

| RESOURCE A | RESOURCE B | RESOURCE C | RESOURCE D |
|---|---|---|---|
| SETTING FOR BINDING MARGIN AND TRIMMING | SETTING FOR BINDING MARGIN, TRIMMING, AND CASING | SETTING FOR BINDING MARGIN, TRIMMING, CASING, AND STAPLING | SETTING FOR BINDING MARGIN IN POCKET BINDING AND TRIMMING |
| PRIORITY=3 | PRIORITY=2 (EMPLOYED) | ×(FUNCTION) | PRIORITY=1 CONFLICT OCCURS× |

ALTHOUGH RESOURCE B IS EMPLOYABLE FOR CURRENT PURPOSE, CONFLICT CAN OCCUR IF DEVICE DOES NOT SUPPORT CASING

RESOURCE D IS EMPLOYABLE ONLY FOR POCKET BINDING

INFORMATION PROCESSING APPARATUS, INFORMATION PROCESSING METHOD, AND INFORMATION PROCESSING PROGRAM

BACKGROUND OF THE INVENTION

1. Field of the Invention

The present invention relates to an information processing apparatus, an information processing method, and an information processing program, capable of dynamically determining, in a wizard for setting properties of a printer driver, a screen to be displayed next on the basis of information indicating functions supported by an image forming apparatus and a value specified by a user.

2. Description of the Related Art

When document data or image data is printed using a printer connected to a computer, a user opens a printer driver setting window and sets print properties by inputting setting values associated with a plurality of properties so that the document or the image is printed in a desired form.

In recent years, great advances have been made in the performance of printers. However, the advances in performance of printers have resulted in an increase in the number of items to be specified in printing. This can cause many users to have a difficulty in using a printer connected to a computer. Besides, there is a possibility that a conflict can occur among setting values of different items. A conflict can cause a value of some item to become invalid. Thus, a user has to specify setting values of all items so that no conflict occurs among items.

Japanese Patent Laid-Open No. 2004-220300 discloses a technique to specify printing conditions by setting print properties of a printer driver using a wizard-type interface which sequentially provides setting screens to allow a user to easily specify setting values. In the technique disclosed in Japanese Patent Laid-Open No. 2004-220300, the printer driver displays a wizard screen including two windows displayed side by side. In one window, an order of setting properties is displayed in the form of a flow diagram, and the other window allows a user to input values of print properties.

However, in the technique disclosed in Japanese Patent Laid-Open No. 2004-220300, because the print information setting wizard is provided by the printer driver, it is necessary to separately prepare programs of print information setting wizards for respective printer drivers.

In the technique described above, the necessity of separately preparing wizard programs for respective printer drivers causes a reduction in the efficiency of developing programs.

In view of the above, it is desirable to provide a technique to dynamically produce a screen, displayed in a wizard used by a printer driver, on the basis of device function information provided by the printer driver and a setting value specified by a user.

In the conventional technique described above, the wizard program is prepared separately for each printer driver, and it is not allowed to use the same wizard program for different printer drivers. Therefore, it is necessary to produce different wizard programs for respective printer drivers, which causes a reduction in development efficiency. In an office environment or the like, in which a large number of printers are connected to computers, it is reasonable to install a plurality of different printer drivers in each client computer. In this case, wizard programs corresponding to respective printer drivers are also installed in each client computer, and thus each client computer has to have additional memory space for installing these programs.

In view of the above, it is also desirable to provide a wizard function usable in common by a plurality of printer drivers.

SUMMARY OF THE INVENTION

The present invention provides an information processing apparatus having a printer driver for producing print data interpretable by an image forming apparatus and sequential display screens for setting print properties, including acquisition means for acquiring, from the printer driver, device function information indicating one or more functions executable by the image forming apparatus, first determination means for determining first screen information on the basis of the device function information acquired by the acquisition means, second determination means for determining second screen information on the basis of the device function information and a setting value input via the first screen based on the first screen information determined by the first determination means, and setting means for setting a print property on the basis of the setting value input via the first screen based on the first screen information determined by the first determination means and a setting value input via the second screen with the second screen information determined by the second determination means.

The present invention also provides an information processing method, in an information processing apparatus having a printer driver for producing print data interpretable by an image forming apparatus and sequential display screens for setting print properties, including the steps of acquiring, from the printer driver, device function information indicating one or more functions executable by the image forming apparatus, determining first screen information on the basis of the device function information acquired in the acquisition step, determining second screen information on the basis of the device function information and a setting value input via the first screen based on the first screen information determined in the first screen information determination step, and setting a print property on the basis of the setting value input via the first screen based on the first screen information determined in the first screen information determination step and a setting value input via the second screen based on the second screen information determined in the second screen information determination step.

The present invention also provides an information processing program executable in an information processing apparatus having a printer driver for producing print data interpretable by an image forming apparatus and sequential display screens for setting print properties, including the steps of acquiring, from the printer driver, device function information indicating one or more functions executable by the image forming apparatus, determining first screen information on the basis of the device function information acquired in the acquisition step, determining a second screen information on the basis of the device function information and a setting value input via the first screen based on the first screen information determined in the first screen information determination step, and setting a print property on the basis of the setting value input via the first screen based on the first screen information determined in the first screen information determination step and a setting value input via the second screen based on the second screen information determined in the second screen information determination step.

The present invention also provides an information processing apparatus including wizard means capable of being called by a plurality of printer drivers to produce a plurality of setting screens, the wizard means including acquisition means for acquiring device function information from a printer driver that called the wizard means, display control means for sequentially displaying a plurality of setting screens in a wizard form on the basis of the device function information acquired by the acquisition means, and setting means for setting a print property according to values input via the plurality of setting screens sequentially displayed by the display control means.

The present invention also provides an information processing method including a wizard process capable of being called in common by a plurality of printer drivers adapted to produce a plurality of setting screens, the wizard process including the steps of acquiring device function information from a printer driver that called the wizard process, sequentially displaying the plurality of setting screens in a wizard form on the basis of the device function information acquired in the acquisition step, and setting a print property according to values input via the plurality of setting screens sequentially displayed in the displaying step.

The present invention also provides an information processing program executable in an information processing apparatus, including a wizard process capable of being called in common by a plurality of printer drivers adapted to produce a plurality of setting screens, the wizard process including the steps of acquiring device function information from a printer driver that called the wizard process, sequentially displaying the plurality of setting screens in a wizard form on the basis of the device function information acquired in the acquisition step, and setting a print property according to values input via the plurality of setting screens sequentially displayed in the displaying step.

Further features of the present invention will become apparent from the following description of exemplary embodiments with reference to the attached drawings.

BRIEF DESCRIPTION OF THE DRAWINGS

FIG. 6 is a block diagram showing a resource priority table module according to an embodiment of the present invention.

FIG. 7 is a diagram showing an example of an operation of a wizard according to an embodiment of the present invention.

FIG. 9 is a flow chart showing an operation of a wizard according to an embodiment of the present invention.

FIG. 14 shows an example in which a resource and a resource priority table are updated.

DESCRIPTION OF THE EMBODIMENTS

The present invention is described in further detail below with reference to exemplary embodiments in conjunction with the accompanying drawings.

First Exemplary Embodiment

Figure 1:
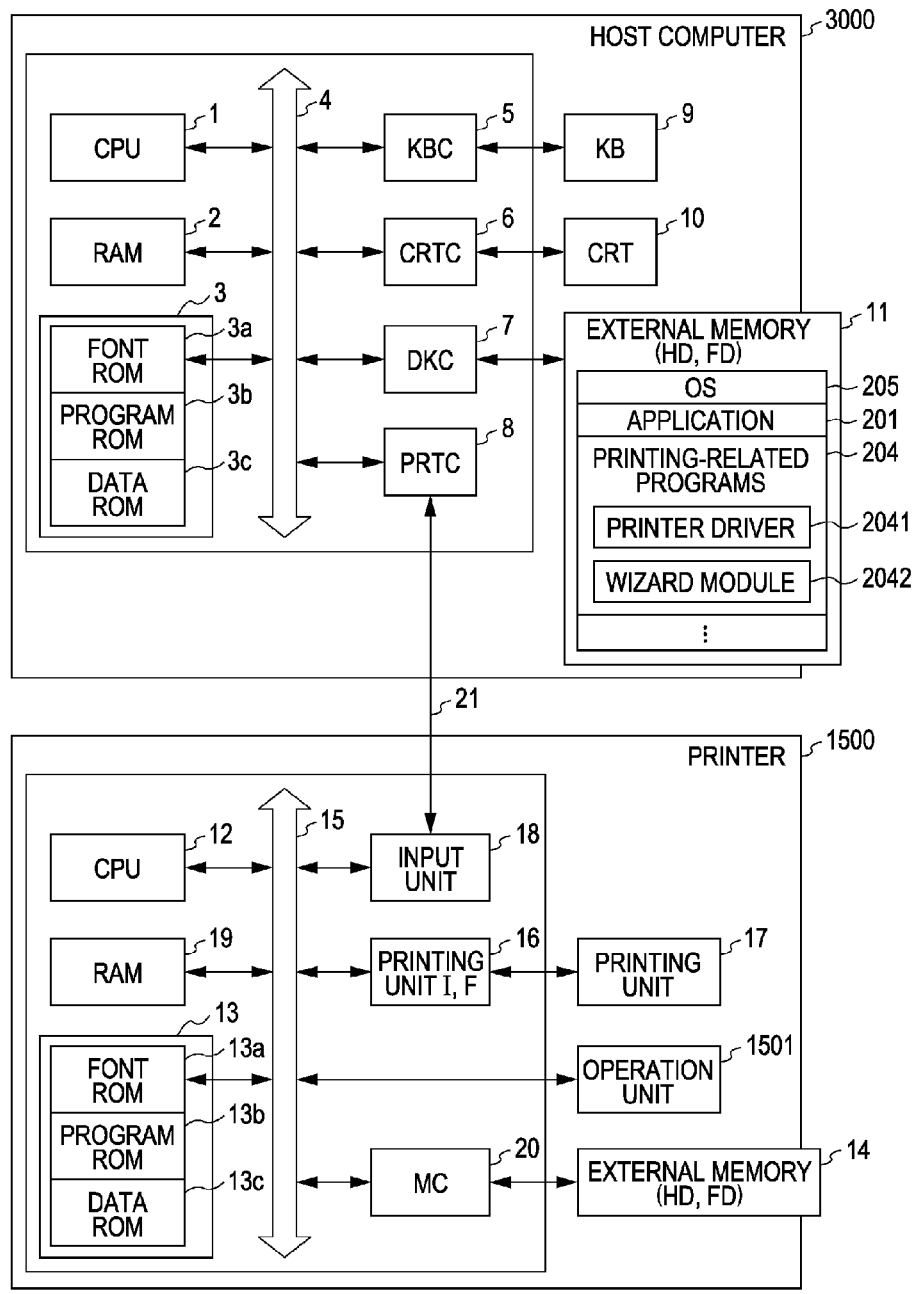
FIG. 1 is a block diagram showing a configuration of a printing system according to an embodiment of the present invention.

FIG. 1 is a block diagram showing a configuration of a printing system according to an exemplary embodiment of the present invention. The printing system includes a host computer 3000 and a printer 1500 adapted to perform printing in accordance with print data received from the host computer 3000.

In the host computer 3000, a CPU 1 generally controls devices connected to the CPU 1 via a system bus 4 according to a program stored in a RAM 2. The RAM 2 also used by the CPU 1 as a main memory or a work area. The ROM 3 stores various kinds of programs and data. The ROM 3 includes a font ROM area 3a in which various font data are stored, a program ROM area 3b in which a boot program and/or a BIOS are stored, and a data ROM area 3c in which various kinds of data are stored.

A keyboard controller (KBC) 5 controls an input operation via a keyboard (KB) 9 and/or a pointing device such as a mouse (not shown). A CRT controller (CRTC) 6 controls an operation of displaying data on a CRT display (CRT) 10. A disk controller (DKC) 7 controls accessing to an external memory 11 such as a hard disk. A printer controller (PRTC) 8, connected to the printer 1500 via a bidirectional interface 21, controls communication between the host computer 3000 and the printer 1500.

The external memory 11 is realized by, for example, a hard disk (HD), a DVD, or a floppy (registered trademark) disk (FD), and is used to store various kinds of programs such as an operating system 205, an application program 201, and a print-related program 204. The external memory 11 is also used to store user files, files being edited, and the like. The print-related program 204 is a program of producing print data using a page description language, and the print-related program is allowed to be used in common by a plurality of similar printers. The printing-related program 204 includes a printer control command generation module (hereinafter, referred to as a printer driver) 2041, and a printer driver UI (User Interface) control module 2042

The application program 201 is loaded in the RAM 2 from the external memory 11 and executed by the CPU 1. The CPU 1 rasterizes outline font data in the RAM 2 thereby making it possible to display data on the CRT 10 in a WYSIWYG (What You See is What You Get) manner. When a user issues a command using a mouse cursor or the like (not shown) displayed on the CRT 10, the CPU 1 opens a window depending on the command and performs data processing. For example, to execute printing, a user opens a print property setting window and sets print properties of the printer driver 2041 to specify printing conditions such as a printing mode. In this description, a print property is synonymous with the print setting information.

Figure 2:
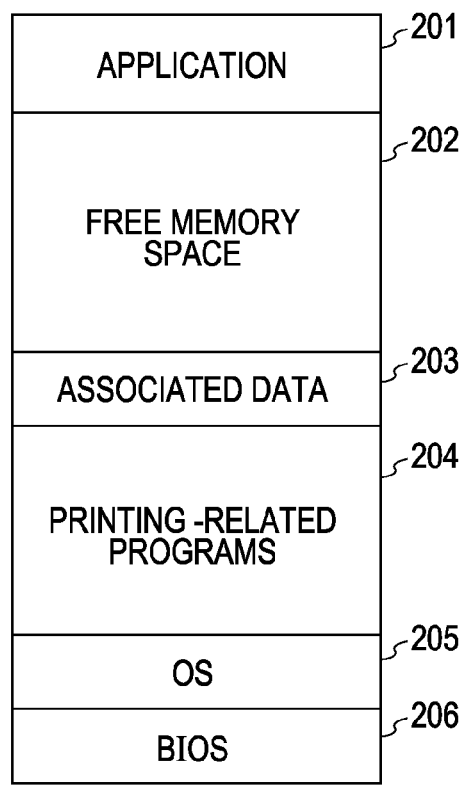
FIG. 2 shows a memory map of a RAM of a host computer in a state in which a particular application program and print-related programs are activated and programs and data are loaded in the RAM.

FIG. 2 shows a memory map of the RAM 2 of the host computer 3000 in a state in which a particular application program and the print-related program are activated and programs and data are loaded in the RAM 2.

In the RAM 2, as shown in FIG. 2, the BIOS 206, the operating system 205, the application program 201, the print-related program 204, and associated data 203 are stored. The RAM 2 also has a free memory space 202. In this state, it is possible to execute the application program 201 and the print-related program 204. If a user issues a print property setting command, the printer driver UI control module 2042 in the print-related program (FIG. 1) displays a print property setting screen on the CRT 10 to allow the user to set print properties using the keyboard 9 or the like.

Figure 3:
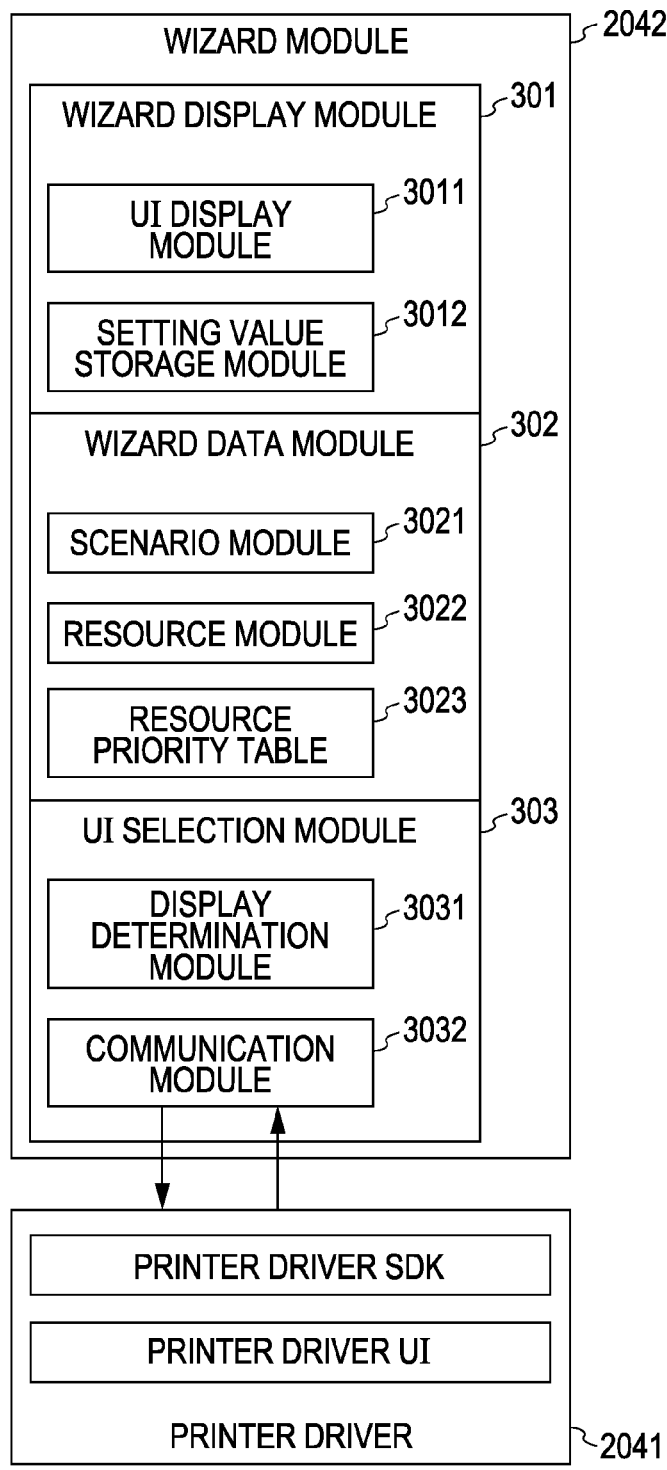
FIG. 3 is a block diagram showing a wizard module and a printer driver according to an embodiment of the present invention.

Now, a wizard mode 2042 is explained. FIG. 3 shows a configuration of the wizard module. In the present description, the "wizard" refers to a process in which one or more setting screens are sequentially displayed to allow a user to input setting values in an interactive manner via the setting screens.

The wizard module 2042 includes a wizard display module 301, and wizard data module 302, and a UI selection module 303.

The wizard display module 301 includes a UI display module 3011 and a setting value storage module 3012. The UI display module 3011 displays a UI selected by the UI selection module 303 from a resource 4032. The setting value storage module 3012 stores values specified by a user in the DEVMODE format. When one or more setting values are changed, corresponding one or more setting values stored therein are changed. When the setting via the wizard is completed, the setting data stored in the setting value storage module 3012 is transferred to the printer driver 2041.

The wizard data module 302 includes a scenario module 3021, a resource module 3022, and a resource priority table module 3023.

Figure 4:
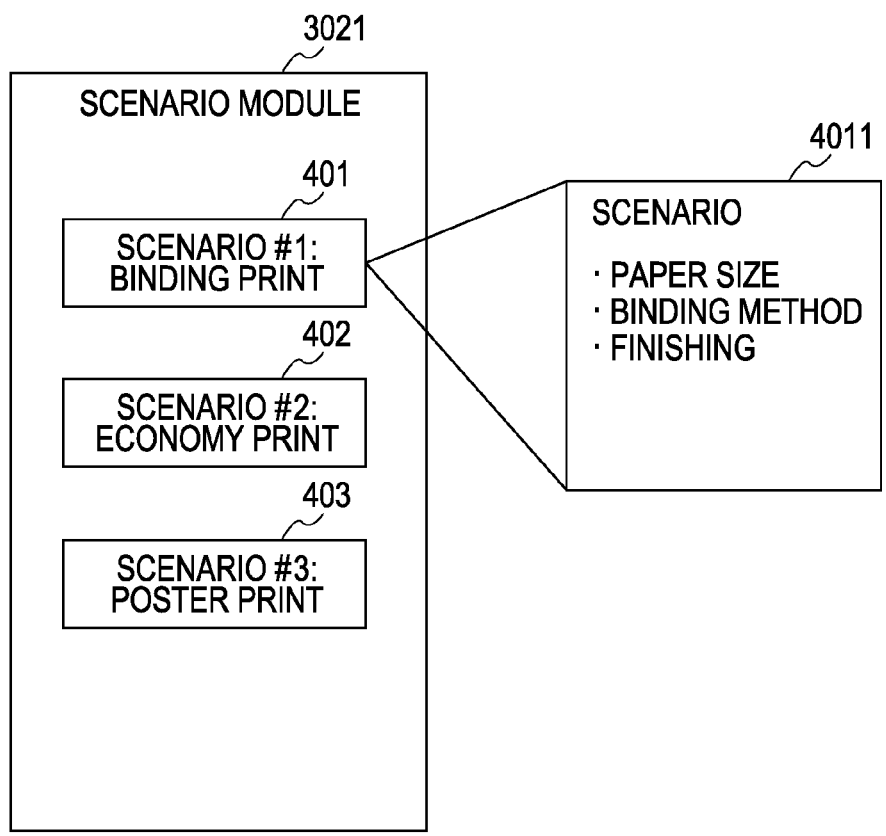
FIG. 4 is a block diagram showing a scenario module according to an embodiment of the present invention.

The scenario module 3021 has scenarios for respective categories of print properties to be set via the wizard. FIG. 4 shows an example of the scenario module 3021. In the example shown in FIG. 4, "Scenario #1: Binding Print" 401 is a scenario associated with binding print. In the content 4011 of "Scenario #1: Binding Print", property items such as paper size, binding method, and finishing to be set are described in the order in which to set properties. That is, the wizard module has print property item information indicating items of each scenario in a specified one of output modes (a binding print mode, an economy print mode, a poster print mode, etc.) selectable for the printer driver and also has scenario information indicating the setting order of print property items. If the wizard module is notified of an output mode selected by the printer driver, for example, in step S802 in FIG. 9 (described later), then the wizard module reads scenario information corresponding to the selected output method. In this specific case, the scenario information includes scenarios 401 to 403 shown in FIG. 4.

Figure 5:
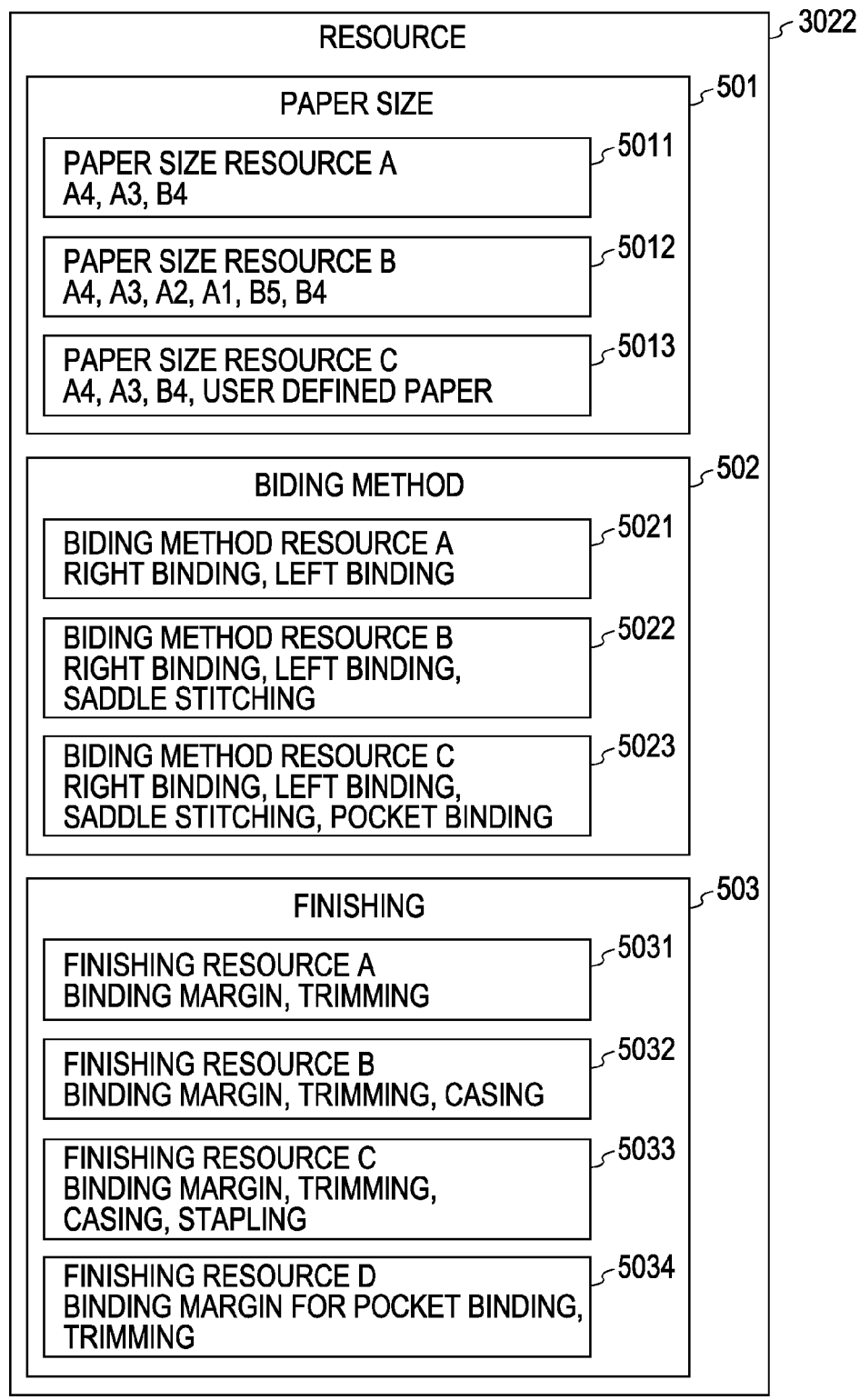
FIG. 5 is a block diagram showing a scenario module according to an embodiment of the present invention.

In the resource module 3022, a plurality of UI resources for respective print property items are stored. FIG. 5 shows an example of the resource module 3022. The resource module 3022 includes paper size category 501 including a "paper size resource A" 5011, a "paper size resource B" 5012, and a "paper size resource C" 5013. The "paper size resource A" 5011 is a UI resource capable of setting paper size of "A4, A3, and B4". The "paper size resource B" 5012 is a UI resource capable of setting paper size of "A4, A3, A2, A1, B5, and B4". The "paper size resource C" 5013 is a UI resource capable of setting paper size of "A4, A3, B4, and user defined paper". Similarly, binding method resources A to C are stored in a binding method category 502, and finishing method resources A to D are stored in a finishing method category 503. These pieces of information correspond to resources 7003 to 7012 shown in FIG. 7. In the present invention, each category of resources is also referred to as a screen property group, and each resource is also referred to as screen property or a property of an input screen. For example, the paper size category 501 is one of the screen property groups, and the paper size resource A is one of the screen properties. In this description, a screen property is synonymous with the screen information.

In the resource priority table module 3023 shown in FIG. 6, resource priority tables 601 to 603 associated with respective categories of resource modules 3022 are stored. In each priority table, information indicating priority (or information indicating that a resource is not selectable if the resource is not selectable) is described in each item row. In each of the priority tables 601 to 603, row title information may be produced on the basis of information received from the printer driver 2041, and column information may be produced on the basis of resource information associated with UIs. Alternatively, row title information may be produced in advance without depending on information from the printer driver.

The priority tables are described in further detail below. For example, the priority table 601 has items "A3 printer", "large size" (up to A1), and "free size printer" (up to A3). In the item "A3 printer", priority is defined only for a resource A, and no priority is defined for resources B and C because the A3 printer supports paper sizes up to A3. The resource B includes setting items not only for paper sizes up to A3 but also for paper sizes greater than A3, that is, A2 and A1. Therefore, when A3 is selected as a printer to be used, if a setting UI corresponding to the resource B is displayed, setting is allowed not only for paper sizes up to A3 but also for A2 and A1. However, if A2 or A1 is selected, the A3 printer is not capable of printing. To avoid the above problem, the resource B and the resource C are specified not to be selectable. In the item "large size printer (A1)", the resource C is specified not to be selectable, because the resource C includes user defined paper which is not supported by the large size printer (A1). The resource B allows it to make setting for five paper sizes up to A1. On the other hand, the resource A allows it to make setting for three paper sizes up to A3. In this case, higher priority is given to the resource B which allows it to make setting for a greater number of paper sizes than to the resource A. The priority is defined in each item in this manner. That is, the priority table module 3023 stores priority tables (such as priority tables 601 to 603) which define the display priority of each screen property of a screen property group for each device function information. The device function information indicates functions executable by printing apparatuses capable of communicating with the host computer.

As described later with reference to steps S708 and S716 in FIG. 8, the wizard module selects a first screen property to be displayed, according to the acquired device function information and the information indicating display priority assigned to each screen property. The wizard module then selects a second screen property to be displayed, in accordance with a setting value input via a screen corresponding to the first screen property selected by the first selection means, the device function information, and the information indicating the display priority assigned to each screen property. Use of the priority table makes it possible for the wizard module to select, from a first screen property group, the appropriate first screen property including information for setting an executable print property associated with a function indicated by the device function information, in accordance with the acquired device function information. Furthermore, as described later with reference to step S717 in FIG. 8, the wizard module selects, from a second screen property group, the appropriate second screen property including information for setting an executable print property associated with a function indicated by the device function information, in accordance with information returned from the printer driver. Note that the print property is information according to which print data produced by an application is output.

A UI selection module 303 includes a display determination module 3031 and a communication module 3032. The display determination module 3031 determines resources corresponding to screens to be displayed in steps S809 to S814 in FIG. 9 described later.

The communication module 3032 transfers information set by the present time to the printer driver 2041 using a printer driver SDK. The communication module 3022 is also configured to interrogate the printer driver for executable device functions and/or allowable settings thereof, and receive a response thereto from the printer driver.

Now, an operation of the wizard module 2042 is described below. FIG. 8 is a flow chart showing an operation of the wizard module, from a step in which the operation is started to a step in which the operation is ended. Note that steps shown in this flow chart are executed by the CPU 1 of the host computer 3000. Referring to FIGS. 7 and 8, a specific example of a flow of the operation according to the present embodiment is described below. In the present embodiment, the host computer 3000 includes a printer driver adapted to produce print data interpretable by an image forming apparatus, and is adapted to sequentially select information associated with an input screen for determining a print property to be contained in the print data and produce a screen which realizes the wizard. Note that the input screen is a screen produced on the basis of the resources shown in FIG. 5.

More specifically, the printer driver issues a command to display an initial setting UI 7101 which allows a user to start the wizard (step S701). The printer driver detects a print property category selected via the initial setting UI 7101 (step S702). In the example shown in FIG. 8, it is assumed that "binding print" has been selected.

In response to the in step S702, the printer driver activates the wizard module (step S703) and sends information indicating the output mode detected in step S702 to the wizard module (step S704). If the wizard module receives, in step S704, the information indicating the binding print as the output mode specified in step S702, the wizard module refers to a binding scenario 7102 stored in advance and interrogates the printer driver for device functions for each item of the scenario (step S705). In the example shown in FIG. 8, the scenario includes items of "paper size setting", "binding setting", and "finishing setting", and thus the wizard modules interrogates the printer driver for device functions associated with these items.

In response to the inquiry in step S705, the printer driver sends device function information 7103 indicating supported device functions associated with the respective items to the wizard module (step S706).

If the wizard module receives the device function information 7103 issued in step S706, the wizard module selects a most appropriate UI resource from the UI associated with the first item of the scenario in accordance with the device function information 7103, and the wizard module displays a UI screen associated with the selected UI resource (step S707). In the example shown in FIG. 8, the first item of the binding scenario is paper size setting. Thus, the wizard module selects a most appropriate UI resource from the paper size setting UI resources 7003 to 7005, in accordance with the received device function information 7103. The details of step S707 are described below with reference to FIG. 7. The wizard module has the resource priority table module 3023 including resource priority tables stored in advance for respective items. The wizard module refers to a resource priority table associated with the item of interest. More specifically, in this specific case, the wizard module refers to a paper size resource priority table 7013 defining priority of paper size resources for each device function information. Thus, the wizard module selects a most appropriate UI resource in accordance with the resource priority defined in the priority table and the device function information 7103 received from the printer driver. In the example shown in FIG. 7, the device function information 7103 received from the printer driver indicates that the device of interest is an "A3 printer". Thus, the wizard module refers to an item of "A3 printer" in the paper size resource priority table 7013. The paper size resource priority table 7013 indicates that a UI resource A 7003 has the first priority, and thus a UI 7104 corresponding to the UI resource A 7003 is displayed. On the other hand, a UI resource B 7004 includes A2 as a paper size, which is not supported as a device function. Therefore, if a UI corresponding to the UI resource B 7004 is displayed, the UI allows it to select A2 as a paper size which is not actually supported. This can cause confusion. To avoid such a problem, the UI resource B 7004 is not selected for the "A3 printer". A UI resource C 7005 includes a user defined paper size as one of the paper sizes. However, the user defined paper size is not supported by the current device of interest, and thus the UI resource 7005 is also not selected.

The wizard module detects a value specified via the UI 7104 displayed in step S707 (step S708).

Thereafter, to determine a most appropriate UI associated with the second item of the scenario, the wizard module refers to a resource priority table associated with the second item (step S709). In accordance with the result of referring in step S709, the wizard module interrogates the printer driver to ascertain whether selectable functions of the item of the UI resource tentatively selected according to the specified value detected in step S708 and according to the resource priority table are actually executable (step S710). More specifically, in the example shown in FIG. 8, the second item is "binding method", and thus a binding method resource priority table 7014 is referred to. Furthermore, from the device function information 7103 received from the printer driver, it is determined that "right" binding, "left" binding and "saddle" stitching are available as binding methods. Thus, the wizard module refers to the binding method resource priority table 7014 to detect the priority assigned to resources in the row of item "right, left, saddle". In this case, it is detected that the UI resource B is assigned the first priority, and the UI resource A is assigned the second priority. In accordance with the above detection result, the wizard module inquires the printer driver whether "right" binding, "left" binding, and "saddle" stitching selectable in the UI resource B having the first priority are executable for "A4" selected in the UI 7104 (step S710).

If the printer driver receives the inquiry issued in step S710, the printer driver determines whether functions of the specified UI resource are executable for the selected value (step S711). The process performed in step S711 is described in further detail below, with reference to FIG. 7. In the example shown in FIG. 7, the device of interest does not support "saddle" stitching for a paper size of "A4". Therefore, if the UI resource B 7007 is selected, the "saddle" stitching will be displayed as one of selectable binding methods although the "saddle" stitching is not actually supported for "A4". Thus, the printer driver returns to the wizard module a message to notify that the UI resource B 7007 includes an unexecutable function (step S712).

If the wizard module receives this negative answer, the wizard module inquires the printer driver whether functions selectable in the UI resource A 7006 with the second priority are executable (step S713). In response to the inquiry issued in step S713, the printer driver checks executability in a similar manner to step S711 (step S714). As a result, the printer driver determines that "left" binding and "right" binding selectable in the UI resource A 7006 are executable for the paper size of "A4", and thus the printer driver returns a positive answer to the wizard module (step S715). Thus, in the example shown in FIG. 8, when the wizard module receives the answer indicating that functions are executable, the wizard module displays a UI 7105 corresponding to the UI resource A 7006 (step S716). If a method is selected in the displayed UI, the wizard module detects which method has been selected (step S717).

Thereafter, to determine a most appropriate UI associated with the third item of the scenario, the wizard module refers to a resource priority table associated with the third item (step S718). In accordance with the result of referring in step S718, the wizard module interrogates the printer driver to ascertain whether selectable functions of the item of the UI resource selected according to the specified value detected in step S717 and according to the resource priority table are actually executable (step S719). More specifically, in the example shown in FIG. 8, the third item is "finishing setting", and thus a finishing resource priority table 7015 is referred to. Furthermore, from the device function information 7103 received from the printer driver, it is determined that the setting of "binding margin", "trimming" and "casing" is allowed. Thus, the wizard module refers to an item of "Binding+Trimming+Casing" in the finishing resource priority table 7015. From the finishing resource priority table 7015, the wizard module detects that a UI resource D 7012 is assigned the first priority, a UI resource B 7010 is assigned the second priority, and a UI resource A 7009 is assigned the third priority. In accordance with the above detection result, the wizard module interrogates the printer driver to ascertain whether setting of "margin in pocket binding" and setting of "trimming" selectable in the UI resource D 7012 with the first priority are executable for "A4 and right binding" selected in the UI 7104 and UI 7105.

If the printer driver receives the inquiry issued in step S719, the printer driver determines whether functions of the specified UI resource are executable for the selected value (step S720). In the example shown in FIG. 8, the UI source D 7012 specified in step S719 includes setting of "margin in pocket binding". However, the printer of interest does not support pocket binding. This means that if a UI corresponding to the UI resource D 7012 is displayed, the UI allows it to set the margin in pocket binding although pocket binding is not supported. Thus, the printer driver returns to the wizard module a message to notify that the UI resource D 7012 includes an unexecutable function (step S721).

If the wizard module receives the message indicating that there is an unexecutable function, the wizard module interrogates the printer driver to ascertain whether selectable functions of the item of the UI resource B 7010 with the second priority are executable (step S722). In response to the inquiry issued in step S722, the printer driver checks executability in a similar manner to step S720 (step S723). As a result, the printer driver determines that setting of "binding margin", setting of "trimming", and setting of "casing" described in the UI resource B 7010 are executable for the paper size of "A4" and for right binding, and thus the printer driver returns a positive answer to the wizard module (step S724). Thus, in the example shown in FIG. 8, when the wizard module receives the answer indicating that functions are executable, the wizard module displays a UI 7106 corresponding to the UI resource B 7010 (step S725). If an item is selected in the displayed UI, the wizard module detects which item has been selected (step S726).

At the point in time at which step S726 is completed, settings in terms of "paper size", "binding", and "finishing" are completed, and thus an end UI 7107 is displayed (step S727). If the wizard module detects an end command issued via the end UI 7107, the wizard module sends values set via the UIs described above to the printer driver (step S728). More specifically, the wizard module determines a print property according to the setting value input via the screen corresponding to the first screen property, the setting value input via the screen corresponding to the second screen property, and the setting value input via the screen corresponding to the third screen property. The printer driver produces a print job according to the setting values notified in step S728. The wizard module sequentially displays screens, such as setting dialog screens 7104 to 7106 shown in FIG. 8, according to screen properties selected in steps S708, S717, and S726.

Figure 8C:
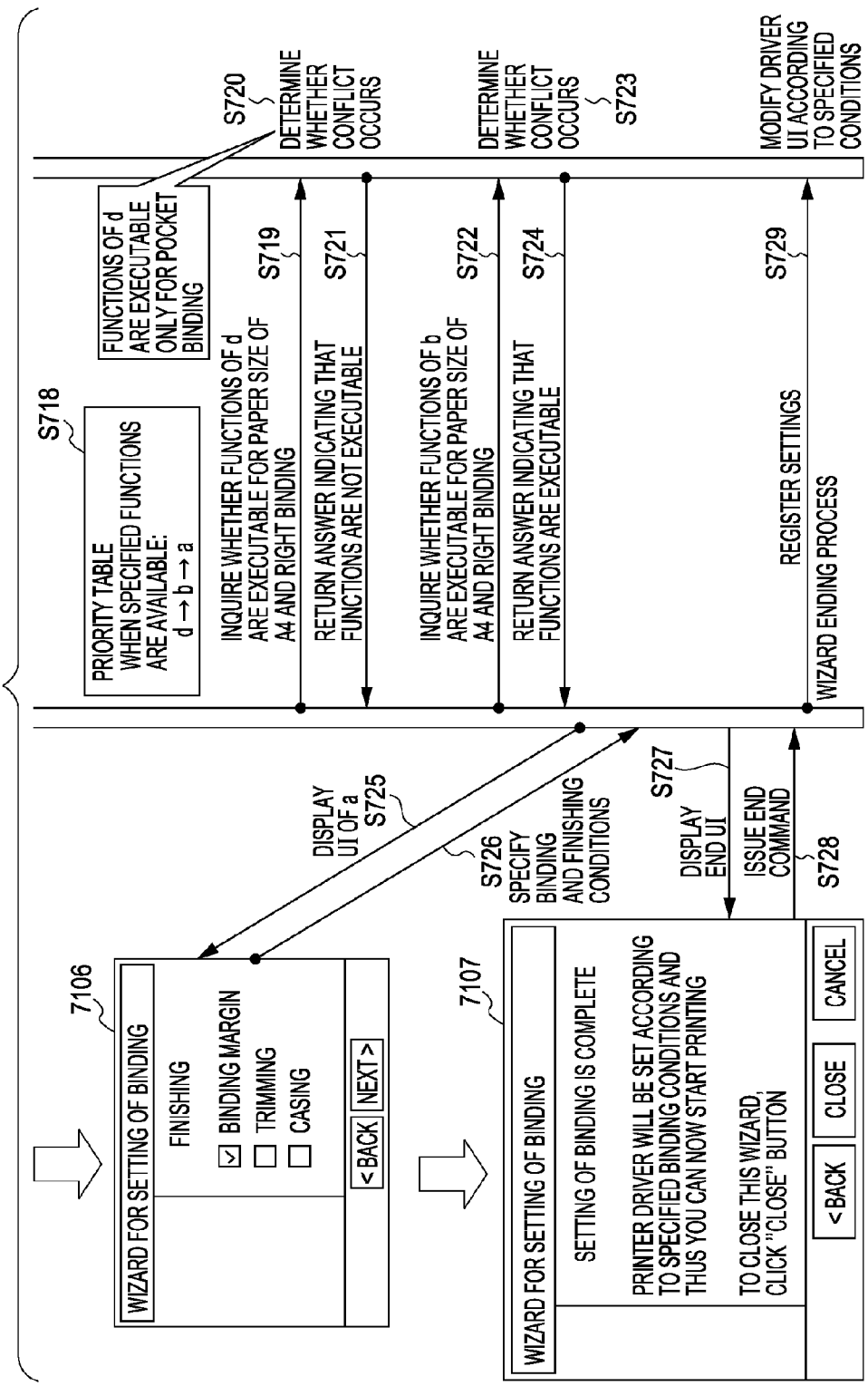
FIG. 8 is a diagram showing an example of an operation of a wizard according to an embodiment of the present invention.

In the above-described process including steps S710, S713, S719, and S722 in FIG. 8, the wizard module interrogates the printer driver to ascertain whether functions included in UI resources tentatively selected according to resource priority tables are executable for setting values specified by a user, and the wizard module selects a UI, all functions of which are executable, from a plurality of screen property groups stored in advance.

Alternatively, the wizard module may produce a setting screen in accordance with a response from the printer driver.

For example, the wizard module may produce a screen for setting a binding method, as described below with reference to FIG. 8.

The wizard module detects what functions associated with binding are supported by a device of interest, from the device function information acquired in step S706.

The wizard module then interrogates the printer driver to ascertain whether detected functions of the device are executable for a setting value specified by a user, and the wizard module produces a setting screen in accordance with a response thereto returned from the printer driver.

If the printer driver receives the inquiry from the wizard module, the printer driver determines whether binding functions of the device are executable for the setting value specified by the user, on the basis of the device function information (that is, the printer driver determines whether a conflict occurs). The conflict checking process can be performed according to a known technique, and thus a further detailed explanation thereof is omitted herein.

A specific example of a procedure of producing a setting screen is described below.

The device function information acquired in step S706 includes information indicating that "right" binding, "left" binding, and "saddle" stitching are supported as binding method. In the example shown in FIG. 8, before specifying the binding method, "A4" was specified as the paper size of a bundle of paper to be bound.

Thus the wizard module inquires the printer driver whether right binding is executable for the specified paper size (A4, in this case). The wizard module stores an answer returned from the printer driver.

The wizard module issues inquiries about left binding and saddle stitching in a similar manner, and stores answers returned from the printer driver.

In the present specific example, as described above with reference to FIG. 8, the printer driver returns an answer indicating that right binding is executable for A4 and an answer indicating that left binding is executable for A4.

According to the answers from the printer driver, the wizard module produces a screen, such as a screen 7105 shown in FIG. 8, which allows it to select a binding method from "right" binding or "left" binding.

In this alternative embodiment, as described above, because the wizard module produces a setting screen on the basis of answers returned from the printer driver, it is not necessary to store in advance a plurality of setting screens and resource priority tables such as those shown in FIG. 6. This allows an improvement in memory efficiency. The details of the process will be described later with reference to FIG. 17.

Now, the operation of the wizard module is described in further detail below with reference to a flow chart shown in FIG. 9.

The wizard module is started by a wizard start command issued by the printer driver (step S801). The wizard module then receives from the printer driver a command to read a particular scenario. For example, in a case in which a user specifies "binding print" and further specifies to "use wizard" in the setting screen (7101 in FIG. 8) of the printer driver, then the wizard module receives from the printer driver a command to read a scenario associated with binding print. In accordance with the command, the wizard module reads the scenario specified by the printer driver (step S802). As shown in FIG. 3, the wizard module has the scenario module 3021, and reads the scenario specified by the printer driver from the scenario module 3021.

The wizard module reads the scenario specified by the printer driver and detects items described in the scenario. As shown in FIG. 4, each scenario includes a plurality of items. For example, the binding print scenario includes items "paper size", "binding method", and "finishing". The wizard module interrogates the printer driver to ascertain the device function information corresponding to an item of the specified scenarios (S803). In response to the inquiry, the printer driver returns, to the wizard module, device function information corresponding to the item of the scenario. That is, from the printer driver, the wizard module acquires device function information indicating functions supported by the printer (image forming apparatus). Note that the information acquired in step S803 is not necessarily from the printer driver.

The wizard module determines a UI resource to be first displayed, in accordance with the device function information associated with the first item of the scenario and in accordance with the resource priority table, and the wizard module displays the determined UI resource (step S804). That is, the wizard module selects a first screen property to be displayed from the screen property group, according to the acquired device function information. The wizard module then produces a setting dialog screen according to the selected screen property. The details of this process have been described above with reference to step S707 in FIG. 8, and thus a duplicated explanation is omitted here. If a user inputs a setting value via the first setting UI, the wizard module detects the input setting value (step S805).

The wizard module then determines whether the scenario read in step S802 has more items (step S806).

If it is determined that the scenario has more items, the wizard module refers to a resource priority table associated with the next item (step S807). More specifically, in accordance with the device function information acquired in step S803, the wizard module determines an item to be referred to in the next resource priority table, in accordance with the device function information acquired in step S803. The details of this process have been described above with reference to step S708 in FIG. 8, and thus a duplication explanation is omitted here. The wizard module initializes the priority (n=1) (step S808) and enquires of the printer driver whether functions described in the UI resource with the n-th priority are executable for the setting value specified via the setting UI (step S809). That is, the wizard module tentatively selects a screen property to be displayed from the screen property group, in accordance with the device function information and the priority information described in the priority table. The wizard module transmits the setting value detected in step S805 and information for setting print property included in the tentatively selected screen property to the printer driver. The details of this process in step S809 have been described above with reference to step S710 in FIG. 8, and thus an explanation is omitted here.

The wizard module determines whether the answer returned in response to the inquiry in step S809 from the printer driver indicates that the functions are executable (step S810).

If in step S810, it is determined that the functions are executable, the wizard module displays a setting UI corresponding to the current UI resource with the n-th priority (step S814). That is, the wizard module selects a screen property to be displayed from the screen property group, in accordance with the setting value input via the screen corresponding to the screen property selected in step S804 and in accordance with the device function information.

On the other hand, in the case in which it is determined in step S810 that the answer indicates that the functions include an unexecutable function, the wizard module determines whether the current resource priority table includes a UI resource having a next priority in the current item (step S811). For example, in step S709 in FIG. 8, it is determined that the UI resource B 7007 has the first priority and the UI resource A 7006 has the second priority in the current item (right binding, left binding, saddle stitching). Thus, the wizard module enquires of the printer driver whether the functions described in the UI resource B 7007 having the first priority are executable. If the answer returned in response to this inquiry indicates that the functions include an unexecutable function, then the wizard module determines whether there is a UI resource having the second priority in step S811.

If it is determined in step S811 that there is no UI resource which is n=n+1 in the priority, the wizard module skips setting of the current item (step S813) and determines whether the scenario has more items. More specifically, the wizard module receives from the printer driver an answer indicating whether to display the screen property tentatively selected in step S809. If the answer indicates that the screen property tentatively selected in step S809 should not be displayed, another screen property other than the screen property tentatively selected in step S809 is selected from the screen property group.

In the case in which it is determined in step S811 that there is a UI resource with n=n+1 in the priority, then the process from S809 to S810 is performed again for n=n+1.

The process from S805 to S814 is performed repeatedly until all items of the current scenario of interest have been processed. If the wizard module determines that the process has been performed for all items (that is, if the answer to step S806 is No), the end UI is displayed (in step S815). The wizard module sends the setting values specified in the respective setting UIs to the printer driver. That is, in step S806, the wizard module determines whether the process of setting the print properties by inputting setting values via the screens with the screen properties selected in step S804 is completed. In the case in which it is determined that the setting of the print property is not yet completed, screen information to be displayed is selected from a screen property group different from the first and second screen property groups, in accordance with the setting values input in steps before step S806 and in accordance with the device function information. The process is performed repeatedly in a similar manner until it is determined in step S806 that setting of the print property is completed. This process corresponds to the process from step S718 to S726 in FIG. 8.

The process described above with reference to FIG. 9 makes it possible to solve the problem in the conventional technique in which different wizard programs are needed for respective printer drivers. The process described above with reference to FIG. 9 provides the feature that the screen displayed in the setting process associated with the printer driver using the wizard is dynamically produced by the wizard module in accordance with the input values and the acquired device function information.

Now, the process performed by the printer driver is described below with reference to FIG. 10.

First, the printer driver determines whether a user has issued a print command (in step S901).

Figure 13:
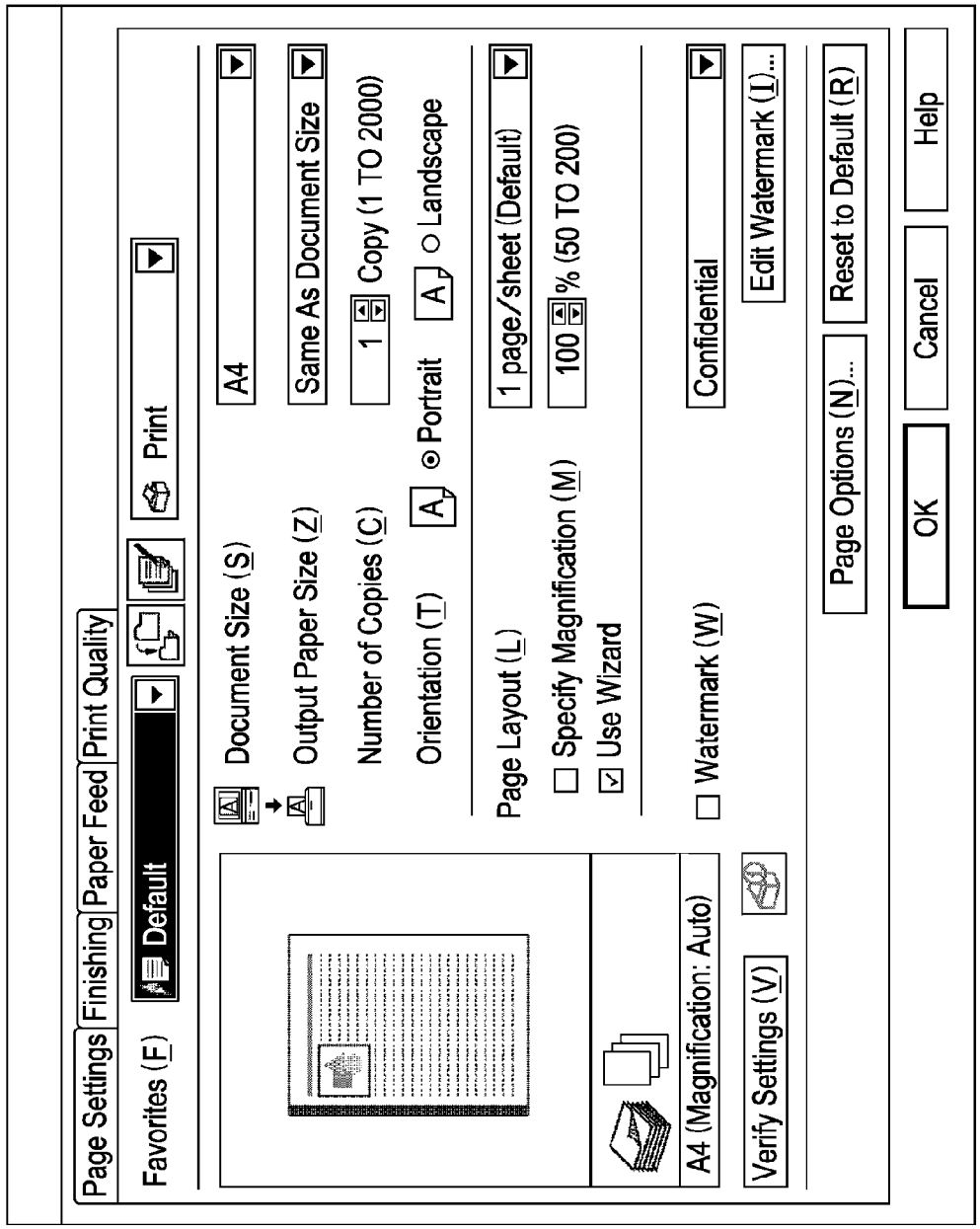
FIG. 13 is a diagram showing a setting UI of a printer driver.

If it is determined in step S901 that the print command has issued and setting of printing properties has been requested, the printer driver displays a setting UI shown in FIG. 13 (step S902). If a "use wizard" is checked in this setting UI and an "OK" button is clicked, the setting UI 7101 shown in FIG. 8 is displayed.

The printer driver determines whether any one of the scenarios is selected in the setting UI 7101 and it is specified to use the wizard in the setting (step S903).

If it is determined in step S903 that it is specified to use the wizard in the setting, the printer driver activates the wizard module (in step S904) and sends information indicating the setting scenario (output method) selected in the setting UI to the wizard module (step S905).

The printer driver then determines whether a function information request has been issued by the wizard module (step S906). If it is determined in step S906 that the function information request has been issued, the printer driver sends device function information associated with the printer driver to the wizard module (step S907). The printer driver manages device function information so that function information can be sent in response to an inquiry from the wizard module.

The printer driver determines whether a setting value and a UI resource have been received from the wizard module (step S908). If it is determined in step S908 that they have been received, the printer driver determines whether functions described in the received UI resource are executable for the setting value received from the wizard module (step S909) and notifies the wizard module of the determination result (step S910). The details of the process in step S909 are described below. The printer driver receives the current setting value and UI resource information from the wizard module. In the UI resource information, functions such as right binding, setting of binding margin, etc. are described. The printer driver determines whether the device of interest is capable of executing functions described in the UI resource for the setting value notified from the wizard module. For example, as in the example shown in FIG. 7, when the device corresponding to the currently selected printer driver is not capable of executing "saddle stitching" for a paper size of "A4", if the printer driver receives from the wizard module the setting value specifying "A4" and the UI resource B 7007 including functions of right binding, saddle stitching, and left binding, the printer driver determines that saddle stitching is not executable for the A4 size. Thus, in step S712 in FIG. 8, the printer driver returns an answer indicating the functions include an unexecutable function to the wizard module.

The printer driver determines whether print property information has been received from the wizard module (step S911). If it is determined that the print property information has been received, the printer driver produces a print job on the bases of the received print property information. In a case in which print property information has not yet been received, there is a possibility that further information will be received from the wizard module, and thus the printer driver enters a waiting state.

A process performed by the wizard module to produce a setting screen is described below with reference to FIG. 17.

Figure 17:
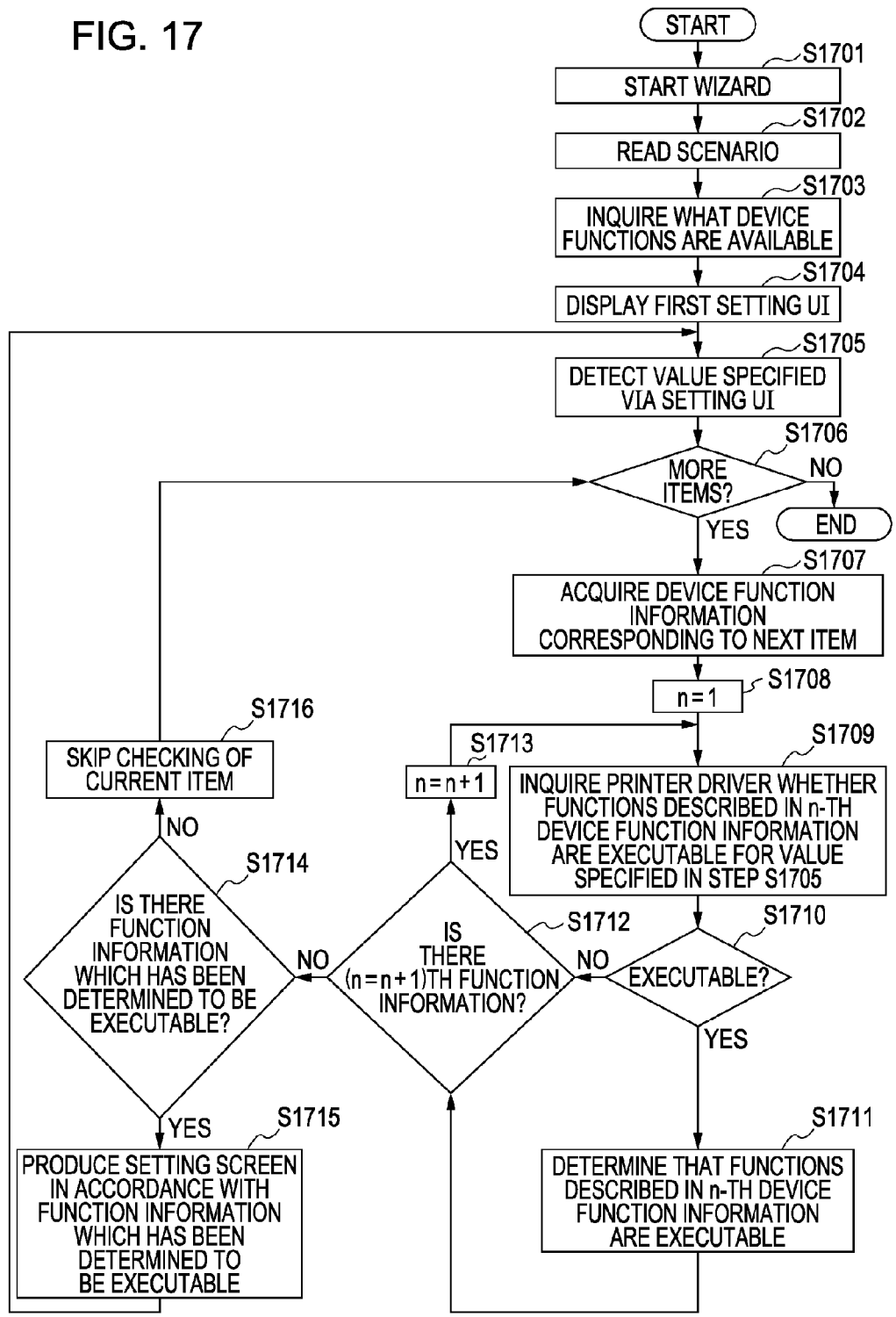
FIG. 17 is a diagram showing an example of an operation of a wizard according to an embodiment of the present invention.

Steps S1701 to S1706 in FIG. 17 are similar to steps S801 to S806 in FIG. 9 described above, and thus a further detailed explanation is omitted here.

The wizard module detects device function information corresponding to a next item (step S1707). More specifically, in the specific example shown in FIG. 8, the scenario specified that setting in terms of "binding method" should be performed after the setting of "paper size". Therefore, the wizard module extracts device function information associated with the binding method from the acquired device function information. More specifically, the wizard module detects three functions "right" binding, "left" binding, and "saddle" stitching from the device function information.

The wizard module initializes the function information number of functions to be checked (n=1) (in step S1708), and the wizard module inquires of the printer driver whether the functions of interest are executable for the setting value specified in step S1705 (step S1709). The process in step S1709 is described in further detail below with reference to FIG. 8. In the example shown in FIG. 8, the wizard module inquires of the printer driver whether "right" binding is executable for a paper size of "A4" specified via the setting screen 7104.

Subsequently, the wizard module determines whether the answer returned in response to the inquiry issued in step S1709 indicates that the function is executable (step S1710).

If the answer indicates that the function is executable (that is, if the answer to step S1710 is Yes), then the wizard module stores information indicating that the function indicated by the n-th device function information is executable.

Thereafter, the wizard module determines whether there are more pieces of device function information to be evaluated (step S1712). The process in step S1712 is described in further detail below with reference to the specific example shown in FIG. 8. For example, after the wizard module inquired of the printer driver about the executability of the "right" binding for the paper size of "A4", the wizard module determines whether there are more binding methods to be checked. In the example shown in FIG. 8, there are "left" binding and "saddle" stitching in addition to "right" binding, and thus, in this case, it is determined in step S1712 that there are more pieces of device function information to be checked.

In the case in which it is determined in step S1712 that there are more pieces of device function information to be checked, the wizard module increments the value indicating the function information number (step S1713).

On the other hand, if it is determined in step S1712 that there is no more device function information to be checked (that is, if the answer to step S1712 is No), the wizard module determines whether there are functions determined as being executable (step S1714).

If it is determined in step S1714 that there is no device function determined as being executable (that is, if the answer to step S1714 is No), the wizard module skips setting of the current item (step S1716).

On the other hand, in the case in which it is determined in step S1714 that there is a device function determined as being executable (that is, if the answer to step S1714 is Yes), the wizard module produces a setting screen for setting the functions determined as being executable and displays the produced setting screen (step S1715). The process in step S1715 is described in further detail below with reference to the specific example shown in FIG. 8. For example, in the case in which the printer driver returns an answer indicating that "right binding" and "left binding" are executable for the paper size of "A4", the wizard module produces a setting screen that allows it to select a binding method from two alternatives "right binding" and "left binding" and displays the produced setting screen.

The wizard module sets, as a print property, the value specified via the setting screen displayed in step S1714 (step S1705), and the wizard module notifies the printer driver of the print property.

As described above, by performing the process shown in FIG. 17, the wizard module sequentially displays a plurality of setting screens thereby allowing a user to make setting according to the wizard.

Figure 10:
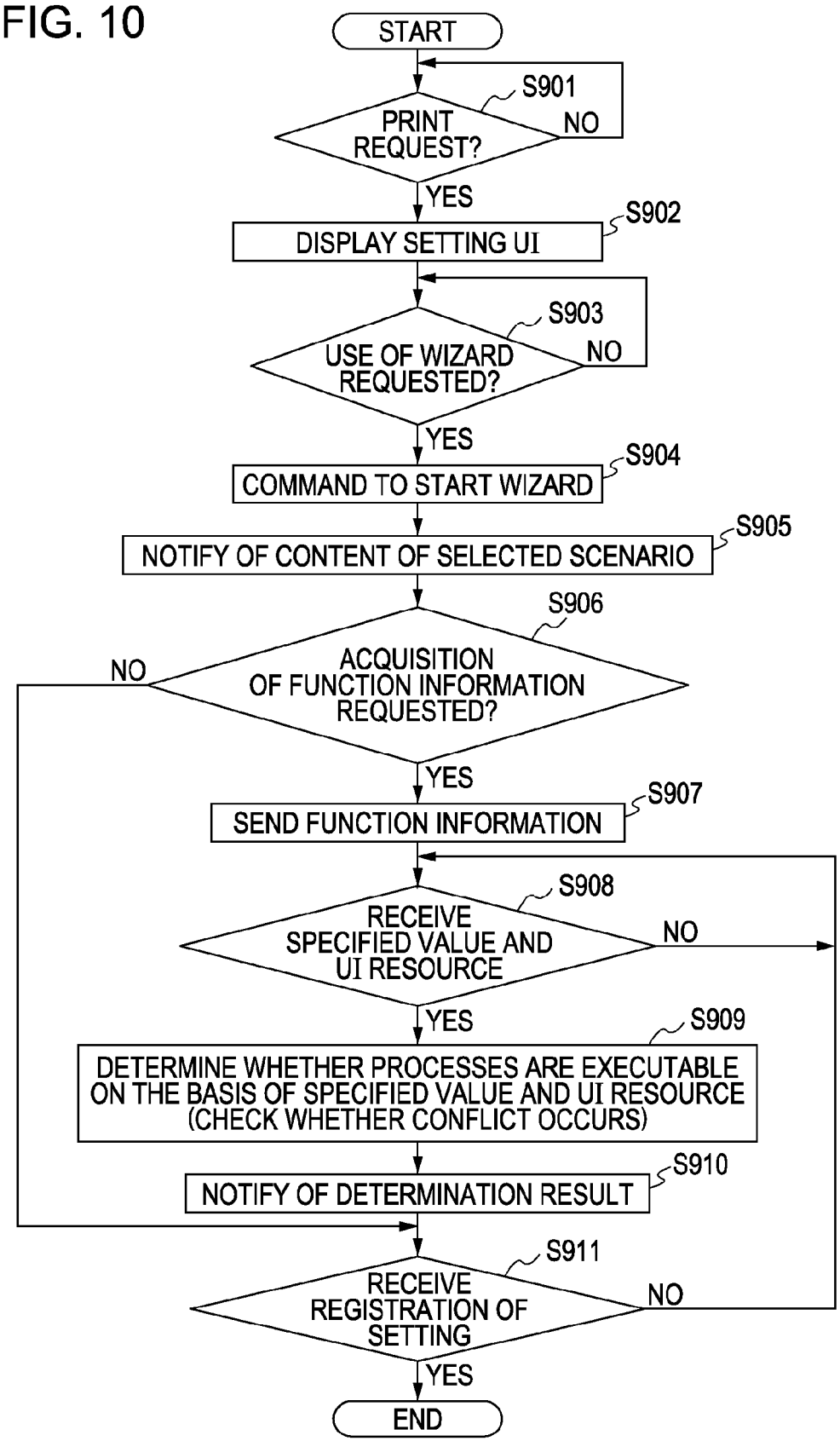
FIG. 10 is a flow chart showing an operation of a printer driver according to an embodiment of the present invention.

Note that when an inquiry is received in step S1709, the printer driver performs a process in response to the inquiry in a similar manner to the process shown in FIG. 10 except that a determination is made separately for each device function.

Now, the relationship between the printer driver 2041 and the wizard module 2042 is described.

Figure 11:
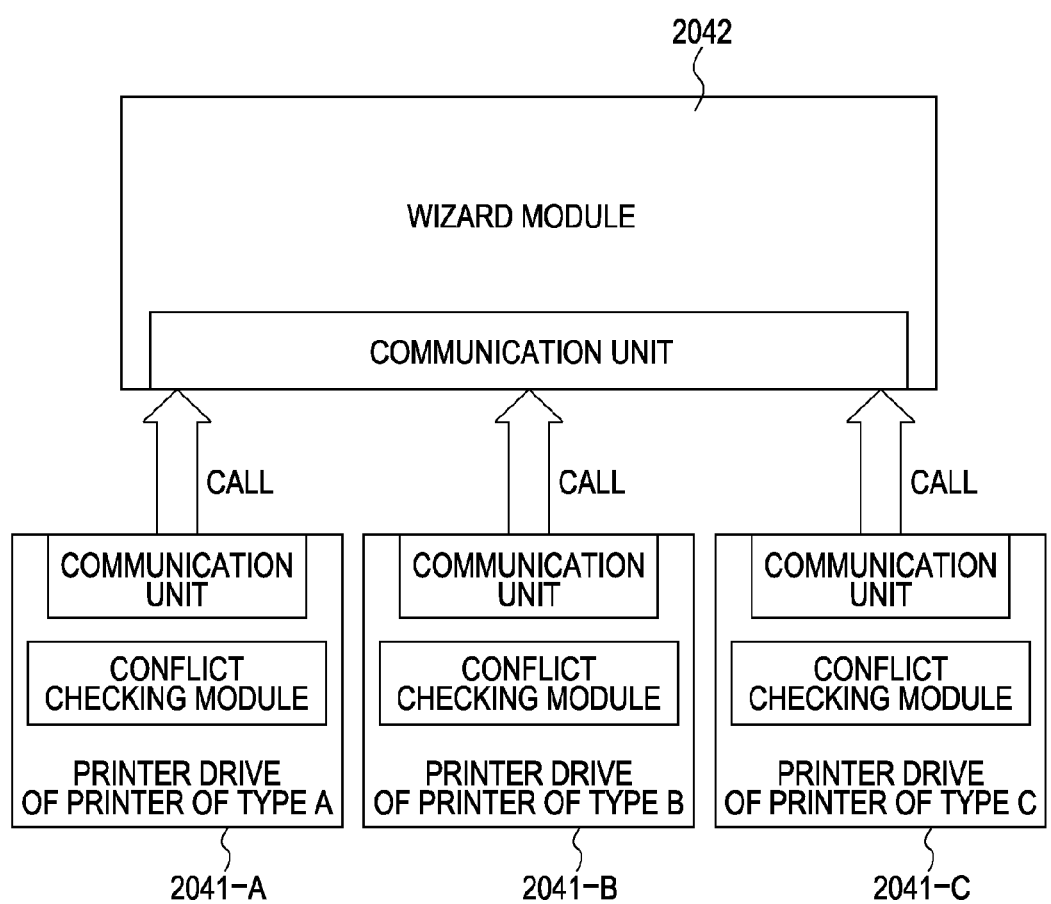
FIG. 11 is a diagram showing the relationship between a wizard module and a set of printer drivers having different functions.

FIG. 11 shows the relationship between the printer drivers 2041A to C and wizard modules 2042. Note that there are printer drivers 2041 for respective printer types. Because functions of printers vary from one type to another, printer drivers are prepared for respective printer types.

The wizard module 2042 is capable of interrogating the respective printer drivers 2041 of settable functions and determines a setting UI to be displayed in accordance with the settable functions. Thus, the wizard module 2042 is capable of providing the wizard capability for any printer driver 2041A to 2041C corresponding to any type of printer, as long as the wizard module 2042 is allowed to communicate with the printer driver 2041 via the communication module 3032. That is, the wizard module is allowed to be used in common by a plurality of printer drivers. Thus, the implementation shown in FIG. 11 makes it possible to achieve the second feature that a common wizard is usable by a plurality of printer drivers.

As shown in FIG. 11, each printer driver has a conflict checking module capable of determining whether a conflict occurs in a setting notified from the wizard module and returning an answer indicating the determination result to the wizard module, as described above with reference to FIG. 8 or 10.

The advantages described below are achieved by the provision of the conflict checking module in each printer driver, thereby making it possible check whether a conflict occurs, in response to an inquiry from the wizard module.

For example, in the example shown in FIG. 11, the wizard module is capable of being called by three types of printer drivers. In a case in which the wizard module is configured so as to have a conflict checking module corresponding to each printer driver, if a new printer driver is added, it is necessary to modify the wizard module so as to include conflict checking modules corresponding to respective four types of printer drivers including the newly added printer driver.

That is, it is necessary to modify the wizard module each time a new printer driver is introduced.

In contrast, in the implementation according to the present embodiment of the invention, because each printer driver has its own conflict checking module to determine whether a conflict occurs, the wizard module does not need to have conflict checking modules corresponding to respective printer drivers.

Thus, when a new printer driver is added, it is possible to provide a setting wizard for the new printer driver without having to modify the wizard module.

Thus, the present embodiment of the invention has the advantage that when a new printer driver is added, it is possible to easily provide a setting wizard for the new printer driver.

Figure 12:
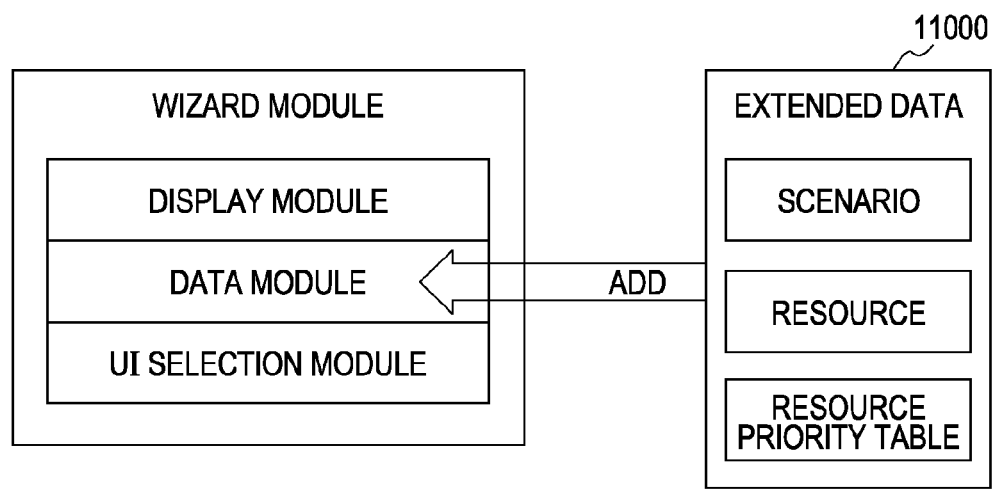
FIG. 12 conceptually shows extension of a wizard module.

Now, extension of the wizard module 2042 is explained below. FIG. 12 conceptually shows extension of the wizard module 2042. It is possible to extend the wizard module 2042 by adding extension data 11000 to the wizard data module 302. When the wizard module 2042 is extended, it becomes possible to use a wizard for specifying a new print property simply by adding a scenario. In addition to a scenario, by adding a UI resource and a resource priority table, it is possible to add a new property settable via the wizard module. That is, the wizard module is allowed to add a new screen property to a group of screen properties, and update the information indicating display priority assigned to each screen property in terms of the added new screen property.

FIG. 14 shows an example in which a UI resource D and a resource priority table are updated. For example, if the resource priority table is modified so as to handle an A0 printer, the paper size priority table shown 7013 in FIG. 7 is modified as 1310 in FIG. 14. That is, the paper size priority table 1310 has a new row for describing priority information associated with the A0 printer. For example, when device function information acquired from the printer driver includes information associated with the A0 printer, the new row (record) for the A0 printer is referred to. In this row, a resource D 1311 is assigned the first priority. Thus, the wizard module determines that a setting UI corresponding to the resource D 1311 is a setting UI to be displayed first. Thereafter, the process is performed in a similar manner as described above with reference to FIGS. 7 and 8, and thus an explanation is omitted here.

Functional blocks of an information processing apparatus according to an embodiment of the present invention are described below with reference to FIGS. 15 and 16.

Figure 15:
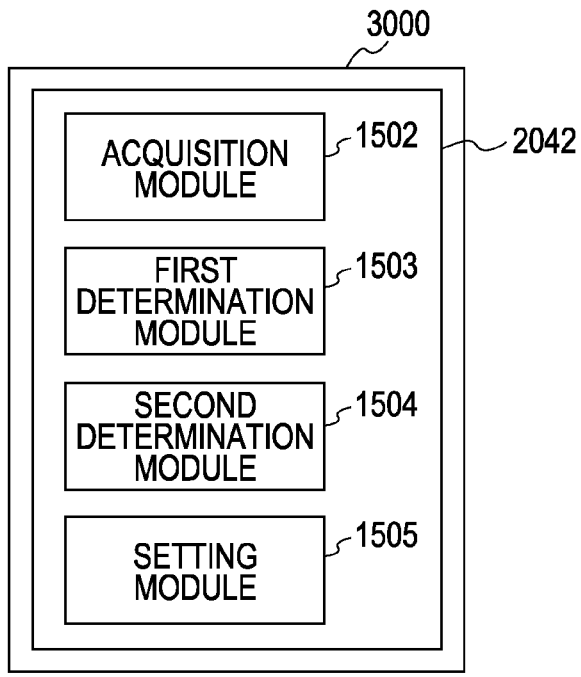
FIG. 15 is a functional block diagram of an information processing apparatus according to an embodiment of the present invention.

FIG. 15 shows an information processing apparatus 3000 including a printer driver adapted to produce print data interpretable by an image forming apparatus. The information processing apparatus 3000 is adapted to sequentially determine properties of setting screens for setting print properties included in the print data and to sequentially display the screens for setting print properties.

An acquisition unit 1502 acquires, from the printer driver, device function information indicating one or more functions executable by the image forming apparatus.

A first determination module 1503 determines a first screen property according to the device function information acquired by the acquisition module 1502.

A second determination module 1504 determines a second screen property on the basis of the device function information and a setting value input via the first screen with the first screen property determined by the first determination module 1503.

A setting module 1505 sets a print property on the basis of the setting value input via the first screen with the first screen property determined by the first determination module 1503 and a setting value input via the second screen with the second screen property determined by the second determination module 1504.

Figure 16:
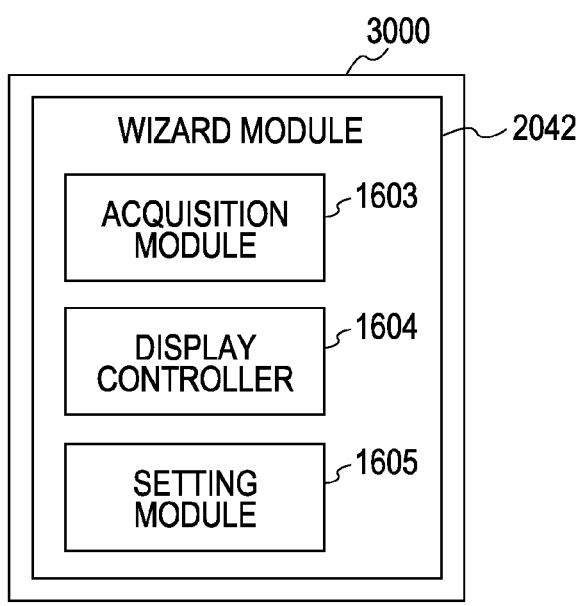
FIG. 16 is a functional block diagram of an information processing apparatus according to a further embodiment of the present invention.

FIG. 16 shows a configuration of an information processing apparatus according to alternative embodiment of the present invention.

In this alternative embodiment, an information processing apparatus 3000 includes a wizard module 2042 capable of being called by a plurality of printer drivers to produce a plurality of setting screens.

The wizard module 2052 includes an acquisition module 1603 adapted to acquire device function information from a printer driver that called by the wizard module 2042, a display controller 1604 adapted to sequentially display a plurality of setting screens in a wizard form on the basis of the device function information acquired by the acquisition module 1603, and a setting module 1605 adapted to set a print property according to values input via the plurality of setting screens sequentially displayed by the display controller 1604.

Note that the present invention may be applied to a system including a plurality of devices/apparatus (such as a host computer, an interface device, a reader, a printer, etc.) or to a single apparatus (such as a copier, a facsimile machine, etc.). The features of the present invention may also be achieved by providing to a system or an apparatus a storage medium having software program code stored thereon for implementing the functions disclosed in the embodiments described above and by reading and executing the program code on a computer. In this case, the program code read from the storage medium implements the functions disclosed in the embodiments described above, and the storage medium on which the program code is stored falls within the scope of the present invention.

Part or all of the process may be performed by an operating system or the like running on the computer in accordance with the program code. Such implementation of the functions also falls within the scope of the present invention. To implement one or more functions according to any of the above-described embodiments of the invention, the program stored on a storage medium may be loaded into a memory of an extension card inserted in a computer or into a memory of an extension unit connected to the computer. In this case, part or all of the process may be performed by a CPU disposed on the extension card or the extension unit in accordance with the loaded program code. Note that such implementation of the functions also falls within the scope of the present invention.

In the embodiments described above, the apparatus includes not only parts essential to the invention but also additional or peripheral parts, and the method or process includes not only steps essential to the invention but also additional or related steps. That is, all elements in the apparatus or method/process described above with reference to specific embodiments are not necessarily needed to practice the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Application No. 2005-370164 filed Dec. 22, 2005 and No. 2006-272765 filed Oct. 4, 2006, which are hereby incorporated by reference herein in their entirety.

What is claimed is:

1. An information processing apparatus having a printer driver for producing print data, comprising:
   a first acquisition unit configured to acquire first device function information indicating one or more functions executable by a first image forming apparatus from a first printer driver of the first image forming apparatus after a screen of the first printer driver is displayed;
   a determination unit configured to determine a first alternative for a first setting item based on the first device function information;
   a first display control unit configured to control a display for displaying a first setting screen of the first setting item including the first alternative;
   a second determination unit configured to determine a second alternative for a second setting item based on the first device function information and an alternative which has been selected via the first setting screen;
   a second display control unit configured to control the display for displaying second, a second setting screen of the second setting item including the second alternative, wherein the first setting item of the first setting screen is not included in the second displayed second setting screen; and
   a setting unit configured to set a print property on the basis of the alternatives which has been input via the setting screens of the first and second setting items,
   wherein each of the first setting screen and the second setting screen is displayed in a wizard form,
   wherein the first setting screen and the second setting screen are provided by a wizard module different from a printer driver,
   wherein the first display control unit displays the first setting screen including the second alternative different from the first alternative, in a case where second device function information acquired by a second printer driver of a second image forming apparatus is different from the first device function information, and
   wherein the wizard module is independent from the printer drivers and used commonly by the first printer driver and the second printer driver.

2. An information processing method, in an information processing apparatus having a printer driver for producing print data, comprising the steps of:
   acquiring first device function information indicating one or more functions executable by a first image forming apparatus from a first printer driver of the first image forming apparatus after a screen of the first printer driver is displayed;
   determining a first alternative for a first setting item based on the first device function information;
   displaying a first setting screen of the first setting item including the first alternative;
   determining a second alternative for a second setting item based on the first device function information and an alternative which has been selected via the first setting screen;
   displaying second a second setting screen of the second setting item including the second alternative, wherein the first setting item of the first setting screen is not included in the second displayed second setting screen; and setting a print property on the basis of the alternatives which has been input via the setting screens of the first and second setting items, wherein each of the first setting screen and the second setting screen is displayed in a wizard form, wherein the first setting screen and the second setting screen are provided by a wizard module different from a printer driver, wherein displaying the first setting screen including the second alternative different from the first alternative, in a case where second device function information acquired by a second printer driver of a second image forming apparatus is different from the first device function information, and wherein the wizard module is independent from the printer drivers and used commonly by the first printer driver and the second printer driver.

3. An information processing program executable in an information processing apparatus having a printer driver for producing print data, comprising the steps of:

acquiring first device function information indicating one or more functions executable by a first image forming apparatus from a first printer driver of the first image forming apparatus after a screen of the first printer driver is displayed;

determining a first alternative for a first setting item based on the first device function information;

displaying a first setting screen of the first setting item including the first alternative;

determining a second alternative for a second setting item based on the first device function information and an alternative which has been selected via the first setting screen;

displaying second a second setting screen of the second setting item including the second alternative, wherein the first setting item of the first setting screen is not included in the second displayed second setting screen; and setting a print property on the basis of the alternatives which has been input via the setting screens of the first and second setting items, wherein each of the first setting screen and the second setting screen is displayed in a wizard form, wherein the first setting screen and the second setting screen are provided by a wizard module different from a printer driver, wherein displaying the first setting screen including the second alternative different from the first alternative, in a case where second device function information acquired by a second printer driver of a second image forming apparatus is different from the first device function information, and wherein the wizard module is independent from the printer drivers and used commonly by the first printer driver and the second printer driver.

4. The information processing apparatus according to claim 1, wherein the print property set by the setting unit is transmitted to a printer driver.

5. The information processing method according to claim 2, wherein the output method is any one of book binding printing, economy printing and poster printing.

6. The information processing method according to claim 2, wherein the print property set is transmitted to a printer driver.

7. The information processing program according to claim 3, wherein the output method is any one of book binding printing, economy printing and poster printing.

8. The information processing program according to claim 3, wherein the print property set is transmitted to a printer driver.

* * * * *